United States Patent [19]
DeMichele

[11] Patent Number: 5,757,647
[45] Date of Patent: May 26, 1998

[54] COMPUTER ASSISTED, MANUAL WORKSTATION

[76] Inventor: Don W. DeMichele, 7650 E. Culver, Mesa, Ariz. 85207

[21] Appl. No.: 519,512

[22] Filed: Aug. 25, 1995

[51] Int. Cl.⁶ .................................................. G06F 19/00
[52] U.S. Cl. ............... 364/468.01; 364/188; 364/474.13
[58] Field of Search ........................ 364/146, 188–191, 364/468.03, 468.15, 468.18, 471.01, 474.09, 474.13, 474.22, 474.24, 474.26, 474.27, 474.11; 65/DIG. 13, 158, 174; 83/936, 886, 56, 747, 940, 941, 74, 75.5, 76.9

[56] References Cited

U.S. PATENT DOCUMENTS

| | | | |
|---|---|---|---|
| 3,543,978 | 12/1970 | Feillet. | |
| 4,380,796 | 4/1983 | Ostby | 364/474.11 |
| 4,422,149 | 12/1983 | Reinmold et al. | 364/471.01 |
| 4,451,895 | 5/1984 | Sliwkowski | 364/188 |
| 4,709,483 | 12/1987 | Hembree et al. | 83/886 |
| 4,941,183 | 7/1990 | Bruder et al. | 364/474.13 |
| 5,005,318 | 4/1991 | Shafir | 65/174 |
| 5,251,142 | 10/1993 | Cramer | 364/474.13 |
| 5,315,522 | 5/1994 | Kauffman et al. | 364/474.07 |
| 5,444,635 | 8/1995 | Blaine et al. | 364/474.13 |

*Primary Examiner*—Reba I. Elmore
*Assistant Examiner*—Steven R. Garland
*Attorney, Agent, or Firm*—Paul F. Wille

[57] ABSTRACT

A workstation for cutting glass into panes includes a personal computer having a board for receiving signals from a transmitter and a video board for controlling a second display in addition to and independently of a first display. The first display is for quantitative data concerning the cut pattern, e.g. the dimension of a cut, and the second display is for qualitative data concerning the cut pattern, e.g. a graphic image illustrating the cut. The worker signals the computer by means of the transmitter to indicate that a cut has been completed. The cut pattern is displayed as a series of individual cuts. Only after the worker has signaled that a cut is completed does the computer display the next cut.

13 Claims, 5 Drawing Sheets

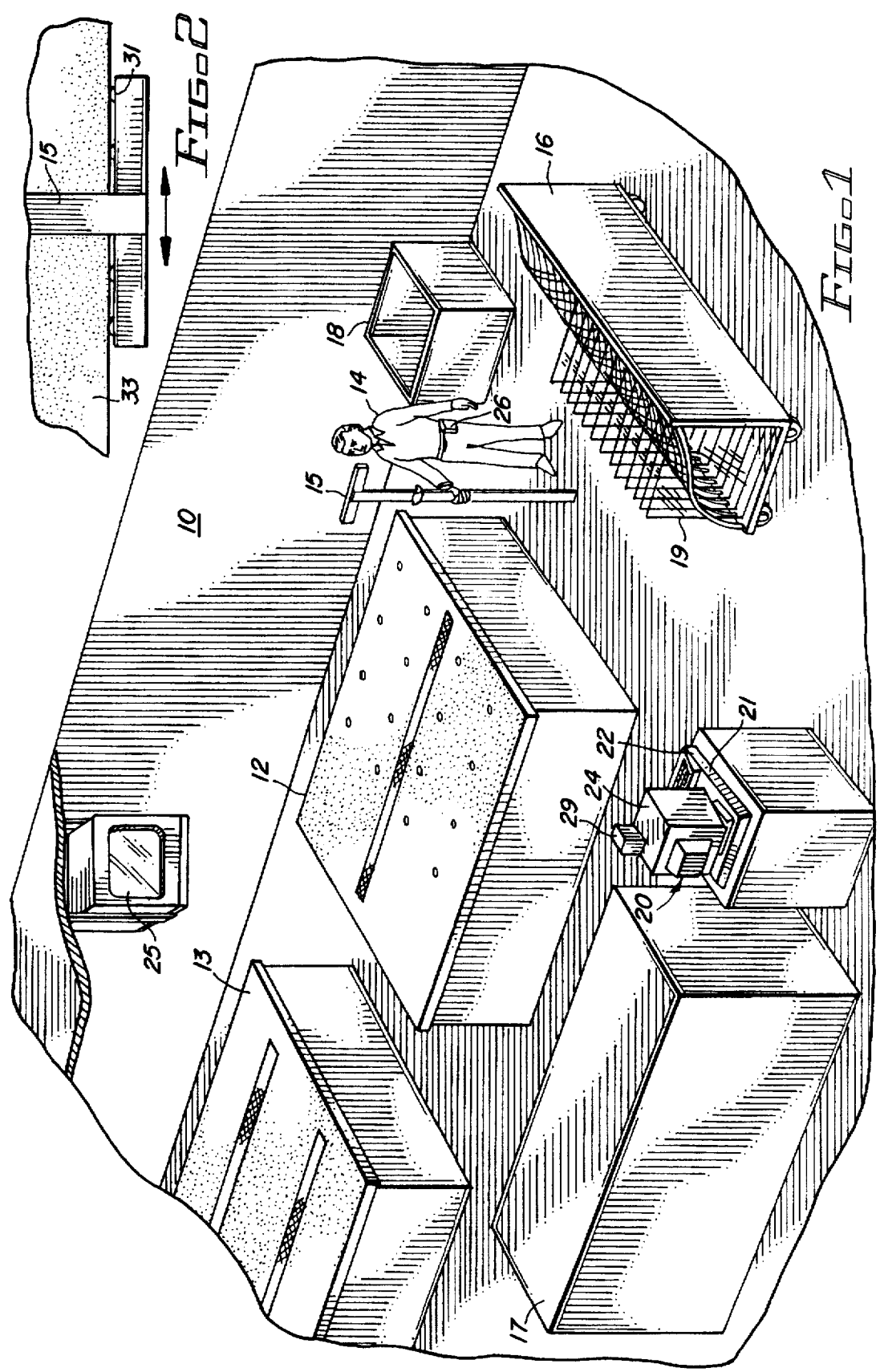

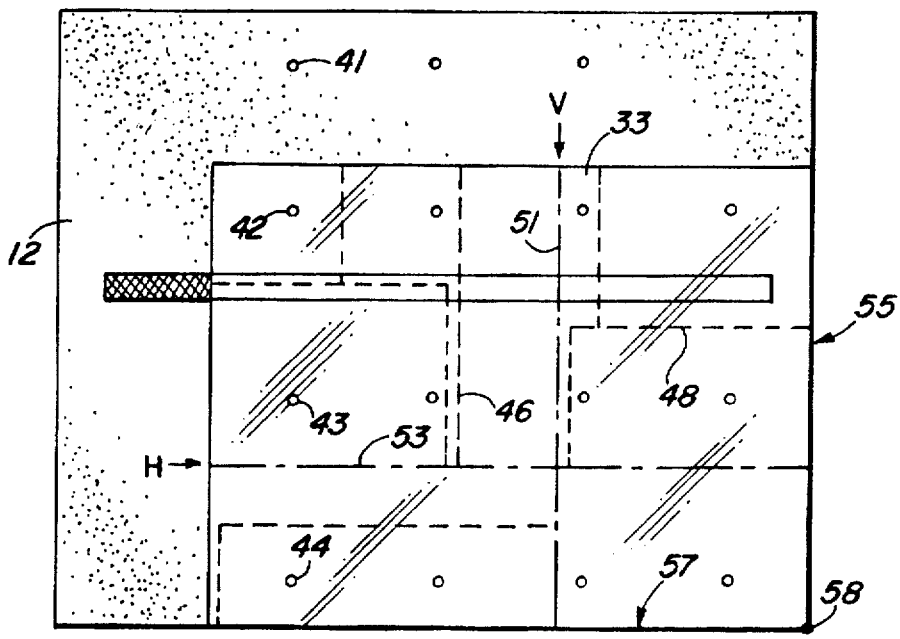
FIG. 3
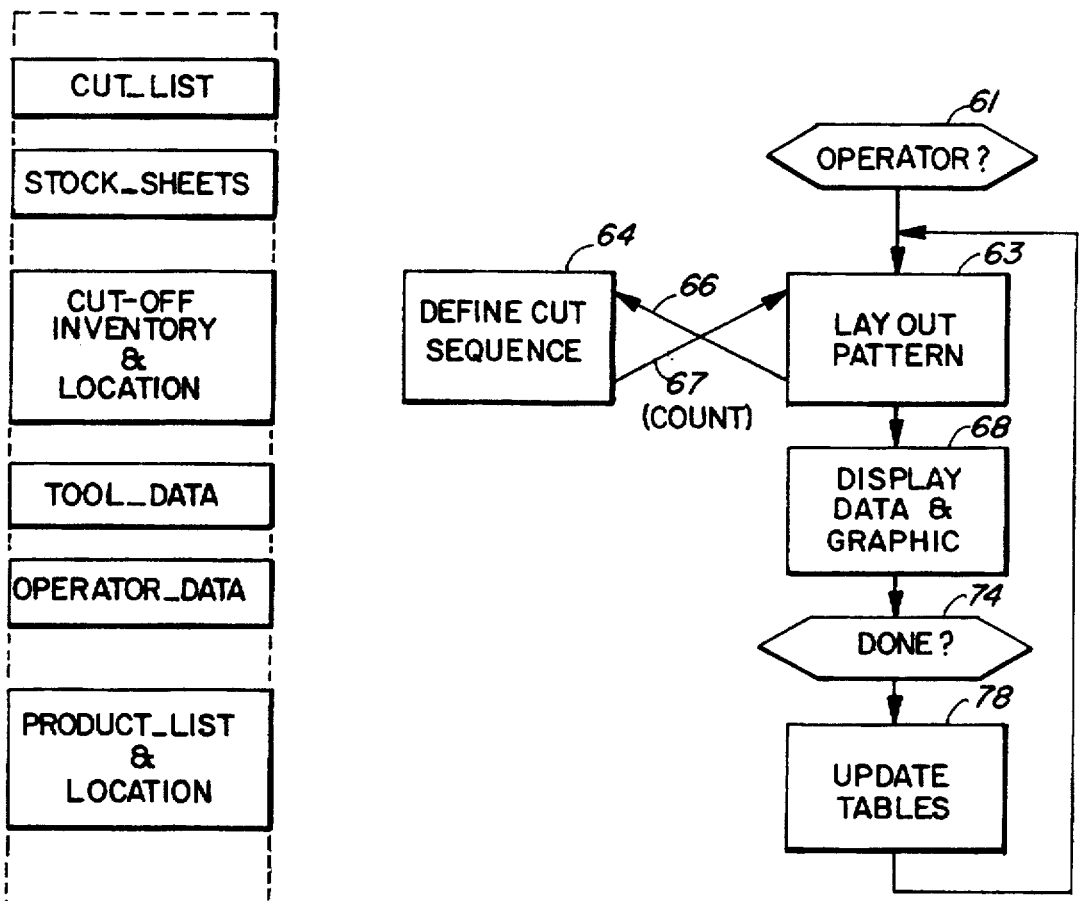
FIG. 10
FIG. 4

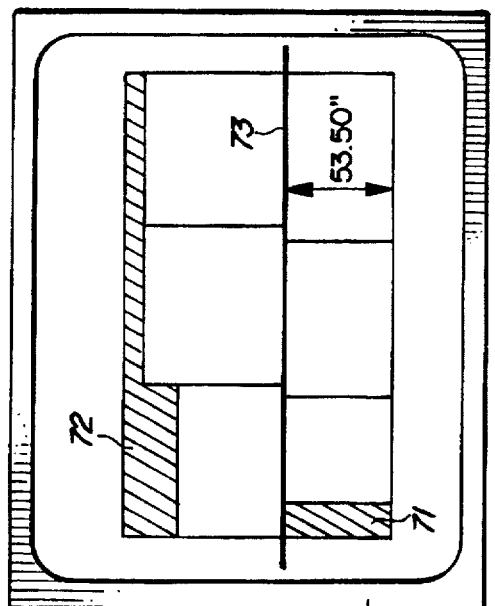
FIG-6
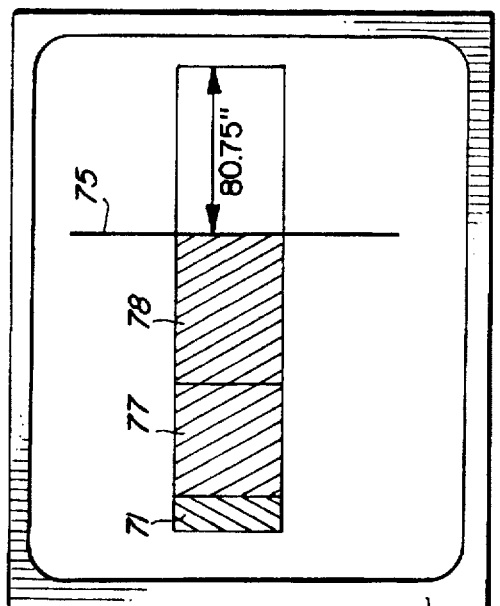
FIG-7
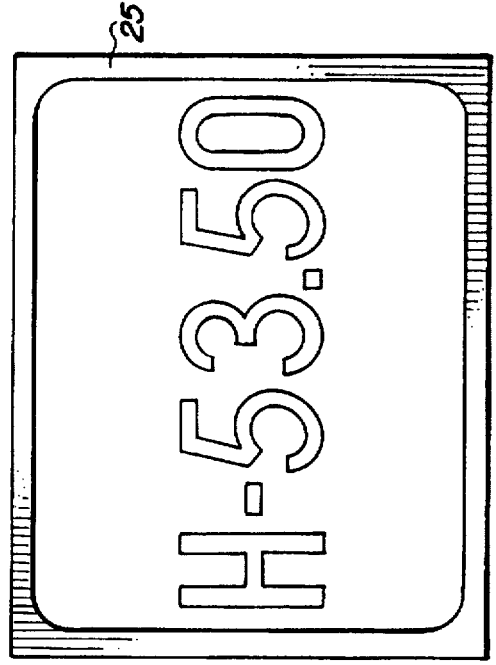
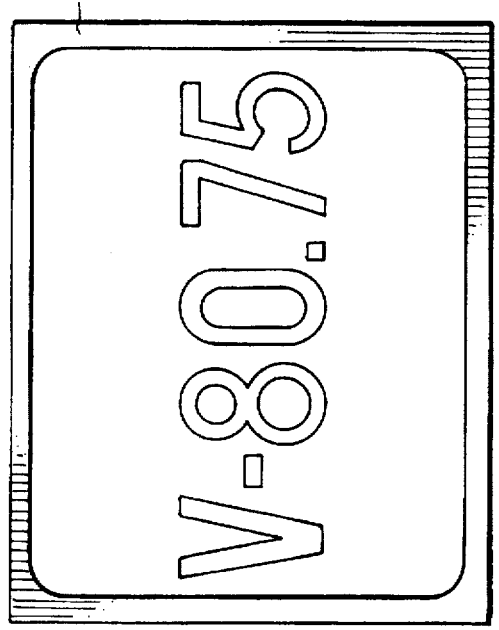

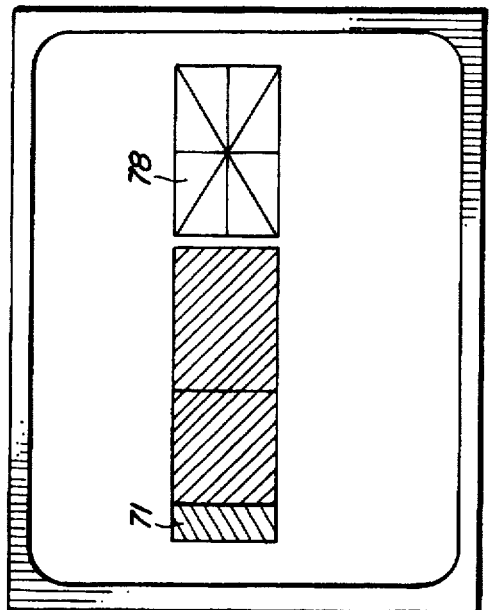
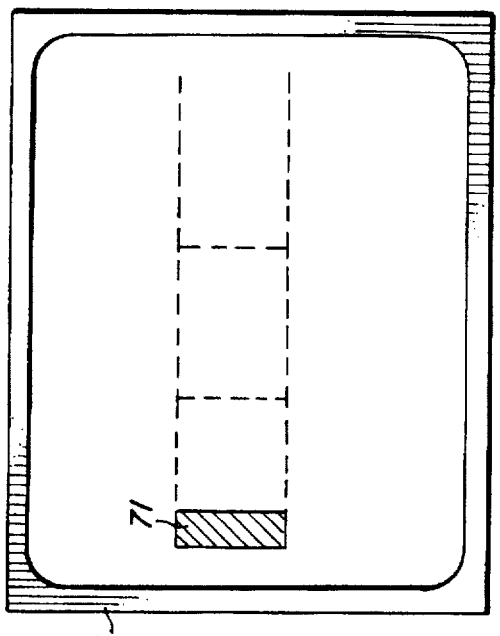
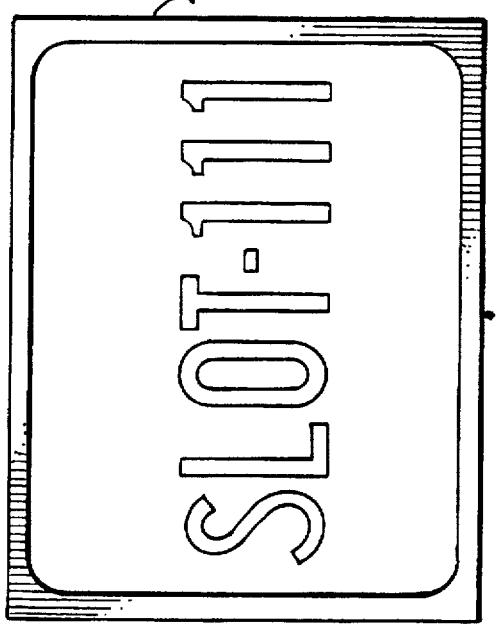
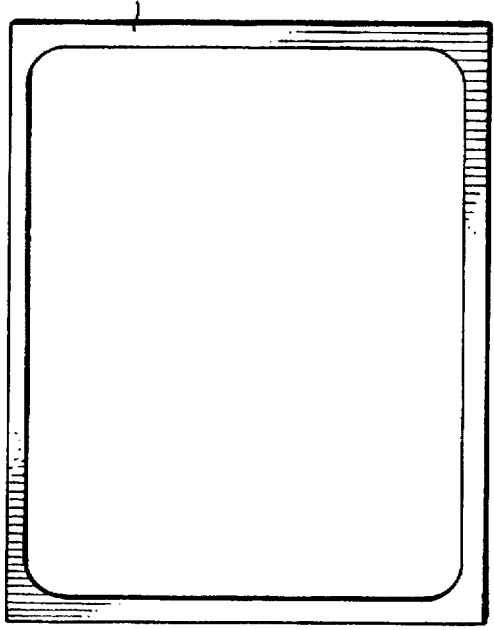
FIG. 8
FIG. 9

COMPUTER ASSISTED, MANUAL WORKSTATION

COPYRIGHT AUTHORIZATION

A portion of this patent document contains unpublished material which is subject to copyright. The copyright owner has no objection to the facsimile reproduction by anyone of the patent document or the patent disclosure, as it appears in the patent file or records of the U.S. Patent and Trademark Office, but otherwise reserves all rights to copy or reproduce the copyrighted material in any form.

BACKGROUND OF THE INVENTION

This invention relates to computer assisted manufacturing systems and, in particular, to a computer assisted, manual workstation in which a sequence of operations is determined by a computer, displayed on a monitor, and the operations are performed manually.

Computers are widely used for manufacturing goods and operate either autonomously, e.g. industrial robots, or interactively. Computers are interactive in the sense of an "expert system," wherein extensive factual information on a particular topic is stored in a computer, or in the sense of augmenting the capability of a human operator, e.g. a mechanical end-effectors imitating human movement but with greater strength or precision. An expert system is commonly used for diagnostic services, e.g. medicine or vehicle repair, and replaces a human expert with a computer.

This invention is unlike any of these systems in that, in accordance with the invention, a computer responds to a particular human operator to define a task that the human operator performs at his own pace. The invention is described in the context of a glass cutting operation but can be implemented in any application in which a plurality of tasks is performed. The invention is particularly suited to manufacturing processes in which a worker performs a plurality of different tasks rather than the same task over and over again.

In a glass cutting operation, a stock sheet of glass is eight feet by twelve feet in size, or larger, and several panes or products can be cut from a single sheet. In automatic or robotic cutting systems, a stock sheet is fed to a cutting station and the panes necessary to fill one or more orders are fitted to the sheet by a pattern optimization program controlling a cutting tool, such as a diamond scribe or cutting wheel. The stock is then cut by the tool, which is mounted on what is essentially a large x-y plotter controlled by the computer.

Automatic cutting stations produce relatively few "cutoffs," pieces that are not product but are large enough to be used to fill a subsequent order, and relatively little scrap, pieces too small to be used to fill an order. One problem with a fully automated, computer controlled cutting system is high cost. Such cutters cost upwards of $100,000 and are too expensive for many small shops. Another problem is that automatic cutting systems require a large volume of orders to efficiently utilize stock. Many small shops operate at a volume below what would justify an automatic system regardless of price.

In a manual glass cutting system, the layout of the cuts is determined by a human operator and the cuts are limited by the reach of the operator and his ability to figure efficient layouts while cutting. Consequently, there are usually more cutoffs and scrap from a manual operation than from an automated operation and the cutoffs tend to be larger. It is desirable to cut finished product from the cutoffs of previous jobs, if possible, but cutoffs are a perishable commodity. The longer a cutoff remains in inventory, the more likely it is to be scratched or broken. Since an operator is not inclined to waste time looking through inventory for a cutoff of just the right size, the inventory grows. Often, a cutoff is saved until it is damaged or forgotten and then thrown away when too many cutoffs accumulate. There is a need to track cutoffs to reduce waste.

There is also a need in glass cutting operations to plan where each finished pane will be placed for the next step in a manufacturing operation, e.g. the assembly of panes into a window. The panes are cut in an essentially random order. Assembling panes into a window requires panes of the same size but different glass, e.g. "bronze" or heat reflecting glass for an outside pane and clear glass for the inside pane of doubly glazed, thermal windows. The bronze glass and the clear glass are cut at different times and from various stock sheets for one or several orders. It is very much desired that the glass cutting operation store the glass product in the proper sequence for assembling windows in the next stage of the manufacturing operation.

An automatic cutting system usually cannot recognize defects in a sheet of glass, such as nicks, scratches, and "fish-eyes" (optical distortions in the glass). An automatic cutting system cuts a glass sheet in accordance with a planned pattern on a specific stock sheet and a defective pane must be re-entered into the system as a new order. In a fully manual system, a person can work around defects in a glass sheet but the operation is time consuming and wasteful of material.

It is desired to enhance the efficiency of a manual glass cutting operation while retaining the advantages that a manual system provides, such as the ability to detect defects. A computer assisted, manual glass cutting operation does not result from substituting a person for an X-Y table and listing the cuts in a printout or on a display. A person cannot perform the function of an X-Y table because, for example, a person has a finite reach. An optimum cutting pattern may require a cut of seventy inches or more, well beyond the reach of a person. Further, an automatic cutting system uses an X-Y table to scribe all cuts prior to fracturing the glass sheet. A person cannot scribe all cuts because of limitations of reach, because the scribed sheet cannot be easily manipulated, and because there is too much data to be understood and executed reliably. Also, the cumulative error of a person is much larger than the cumulative error of an automatic cutter.

U.S. Pat. No. 5,005,318 (Shafir) discloses a glass scribing machine in which a first carriage moves in a first direction and a second carriage, mounted on the first carriage, moves in a second direction, perpendicular to the first direction. The second carriage includes a head for scribing glass. U.S. Pat. No. 4,941,183 (Bruder et al.) discloses a computer assisted system for cutting animal skins in which an image from a template is projected onto the work and the location and position of the template is sensed by a digitizer. A computer checks the cuts to minimize waste and, if there is underutilization of the skin, the templates are placed on the skin in a different pattern. U.S. Pat. No. 4,709,483 (Hembree et al.) discloses a glass cutting system using an X-Y table and a computer controlled head for cutting the glass in accordance with a predetermined pattern. Waste pieces are re-cut to standard sizes for storage and all cuts are labeled by a marker. U.S. Pat. No. 4,422,149 (Reinmold et al.) discloses in FIG. 1 a glass cutting machine using an X-Y plotter. U.S. Pat. No. 3,543,798 (Feillet) discloses a system for scribing a glass sheet in two directions in separate operations. The glass sheet is first scored in a first direction and then moved to a second location where the sheet is scored in a second direction, perpendicular to the first direction.

In view of the foregoing, it is therefore an object of the invention to provide a computer assisted, manual workstation.

A further object of the invention is to provide a computer assisted, manual workstation adapted to individual workers.

Another object of the invention is to provide a computer assisted, manual workstation which provides product in a coordinated fashion to the next stage of a manufacturing operation.

A further object of the invention is to provide a computer assisted, manual workstation that operates at a pace set by a human worker.

Another object of the invention is to provide a computer assisted, manual workstation that can be adapted to a particular piece of stock, e.g. to work around defects in the stock, under the control of a worker.

A further object of the invention is to provide a computer assisted, manual workstation that tracks cutoffs.

Another object of the invention is to provide a computer assisted, manual workstation that recognizes individual workers and optimizes operation according to the preferences of each worker.

A further object of the invention is to provide a computer assisted, manual workstation that displays quantitative and qualitative data for a worker.

SUMMARY OF THE INVENTION

The foregoing objects are achieved in this invention in which a manual workstation includes a personal computer provided with a board for receiving signals from a transmitter and with a video board for controlling a second display in addition to and independently of a first display. The computer is otherwise conventional, e.g. a personal computer based on a 80486 microprocessor. The first display is for quantitative data, e.g. the dimension of a cut, and the second display is for qualitative data, e.g. a graphic image illustrating the cut. The worker communicates with the computer by means of the transmitter, e.g. to indicate that a cut has been completed, or by way of the keyboard for the computer.

Software in the computer includes a pattern optimizing procedure modified to accommodate individual workers. Cuts are laid out with respect to a reference point on a cutting table and the computer optimizes both the pattern of the cuts and the sequence of the cuts for a worker. The software tracks cutoffs in inventory, directs the worker to use a cutoff rather than standard stock, when appropriate, for making product, and identifies the location of the stored cutoff. The software tracks product and directs the worker to store finished product at a particular location in a first rack and to store cutoffs at particular locations in a second rack. The product is stored in the first rack in a sequence appropriate for the next phase of manufacture, e.g. assembly into windows.

BRIEF DESCRIPTION OF THE DRAWINGS

A more complete understanding of the invention can be obtained by considering the following detailed description in conjunction with the accompanying drawings, in which:

FIG. 1 is a perspective view of a glass cutting shop incorporating a computer assisted, manual workstation constructed in accordance with the invention;

FIG. 2 is a detail of a scribing tool known as a speed cutter;

FIG. 4 is a flowchart of the software for assisting a person cutting glass;

FIG. 5 illustrates a series of menus as provided for a worker to enable customizing the cut patterns in accordance with the preferences of the worker;

FIG. 6 illustrates the two displays telling the worker the orientation, dimension, and location of the first cut;

FIG. 7 illustrates the two displays telling the worker the orientation, dimension, and location of the second cut;

FIG. 8 illustrates the two displays telling the worker where to store the first pane;

FIG. 9 illustrates the two displays when the remaining piece is scrap; and

FIG. 10 is a memory map of the data used in producing the cut sequence for a worker.

DETAILED DESCRIPTION OF THE INVENTION

Figure 3:
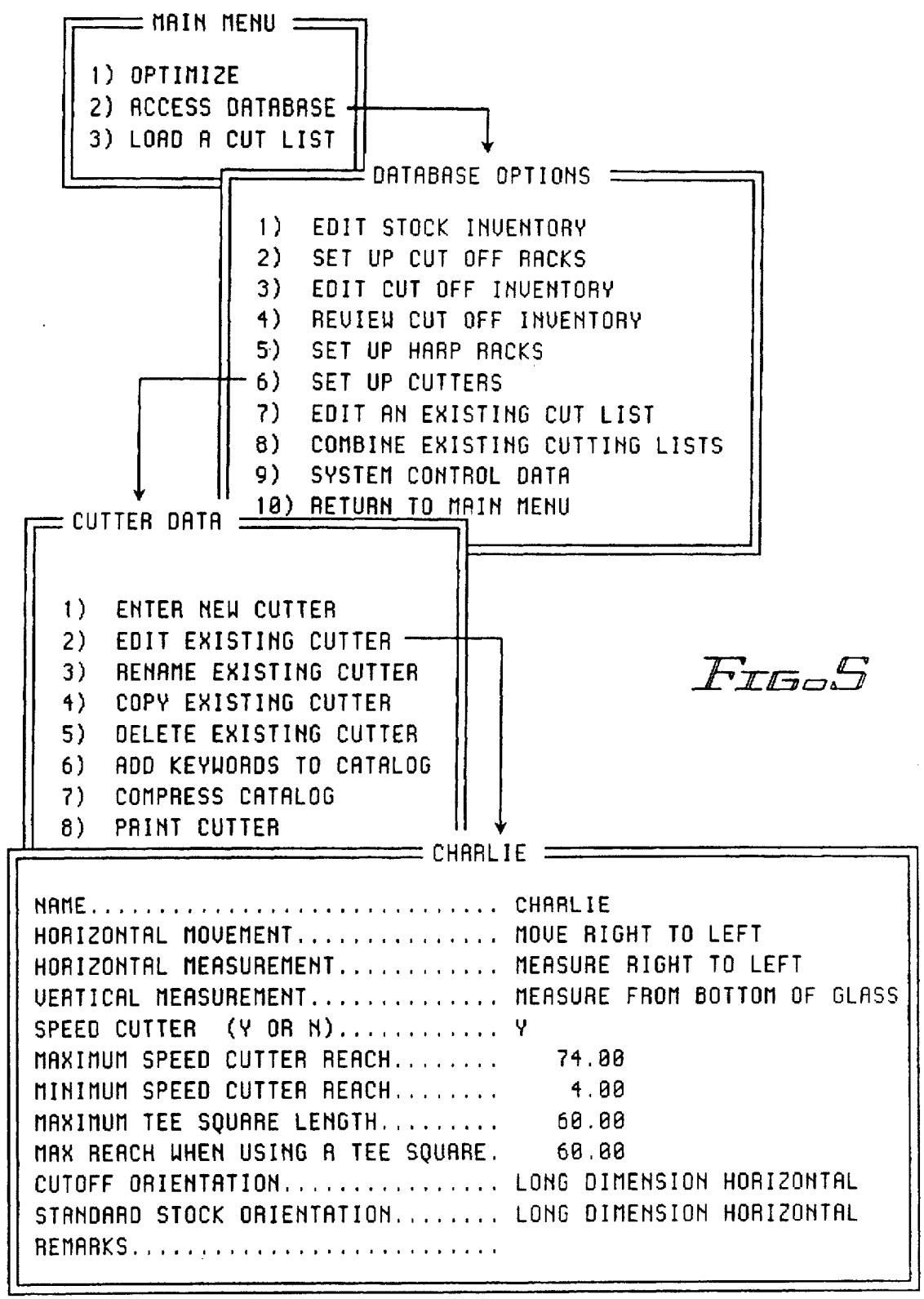
FIG. 3 is a plan view of a cutting table with a glass sheet position for a first cut.

In FIG. 1, work station 10 of a glass cutting facility includes cutting table 12 and an optional feed table 13 for supplying a glass sheet (not shown) to cutting table 12. Operator 14 uses speed cutter 15 to scribe a line parallel to and a predetermined distance from an edge of the glass sheet. The glass sheet is then moved to bring the scribe line near the edge of cutting table 12 and the sheet is flexed, causing the sheet to fracture along the scribe line. The result of fracturing a sheet along predetermined scribed lines is a pane which is stored in "harp" rack 16, cutoff rack 17, or scrap bin 18. Pane 19 is one of several panes stored in rack 16.

As illustrated in FIG. 2, speed cutter 15 is a T-square having several small wheels, such as wheel 31 attached to the crossbeam of the square for enabling the square to ride along an edge of glass sheet 33. A trammel mounted, diamond point or steel wheel for speed cutter 15 (FIG. 1) is positioned along the stem of the T to determine the distance of a scribe line from the edge of sheet 33. Suitable jigs or other devices can be used for scribing curved lines.

As described thus far, the facility illustrated in FIG. 1 is a fully manual work station as known in the prior art. In accordance with the invention, computer system 20 includes CPU (central processing unit) 21, keyboard 22, first monitor 24, and second monitor 25. Computer system 20 is a personal computer such as a computer based upon an 80486 microprocessor. There are two boards added to CPU 21. The first board is a video driver for second monitor 25. The second board is a digital I/O board for receiving signals from beeper 26, attached to the belt of operator 14. Beeper 26 can be any suitable signaling device utilizing acoustic, ultrasonic, infrared, or radio frequency waves to communicate with CPU 21. Signals emitted by beeper 26 are detected by receiver 29 and coupled to a digital I/O board within CPU 21.

As more fully described herein, first monitor 24 displays qualitative or graphic information illustrating the position of a cut for operator 14. Second monitor 25 displays quantitative data, identifying for operator 14 the specific position and orientation of a scribe line.

FIG. 3 is a plan view of table 12, partially covered by glass sheet 33. Table 12 has a textured surface and includes a plurality of holes, such as holes 41, 42, 43, and 44. Air at low pressure is supplied to the holes in table 12 for partially lifting sheet 22 and enabling the sheet to slide across the surface on table 12. The textured surface, e.g. carpeting, on table 12 facilitates holding sheet 33 in place when air is not supplied through the holes in the table.

A plurality of possible cuts is indicated in FIG. 3 by dashed lines such as lines 46 and 48. Dot-dash line 51 extends vertically across the width of sheet 33. Dot-dash line 53 extends horizontally along the length of sheet 33. The layout of all of the potential cut lines is determined by an optimizing program in the computer. Such programs are known per se in the art. In accordance with the invention, the cut pattern is optimized for an individual operator. For example, vertical line 51 is further from edge 55 than line 53 is from edge 57. In accordance with criteria previously given to the computer, the computer refines the optimized cut pattern and displays the modified cut pattern, indicating that the first scribe should be made along horizontal line 53.

The refinement in the optimized pattern could be as simple as rotating the cut pattern or flipping the cut pattern about a vertical or a horizontal axis. The refinement is based on data supplied by each operator, who identifies himself to the computer at the beginning of each job. One item of data is the preferred reference corner. As indicated in FIG. 3 by dot 58, the lower right hand corner is the reference point for all measurements for a right-handed operator and a cut pattern is rotated or flipped to minimize the distance from that point.

FIG. 4 illustrates the overall operation of the software in accordance with the invention. Block 61 is essentially a wait loop that asks an operator to identify himself and to provide responses to a series of questions concerning the preferences of that particular person. If the preferences have been previously given, the wait loop in block 61 simply waits for the identity of a particular operator and then proceeds to the optimization. Orders for products are converted into a list of panes to be cut from particular types of glass. In a typical glass cutting operation, eight to twelve different kinds of glass are stored for a variety of applications. The sheets may differ in thickness or in glass composition or both. The production of a cut list from a plurality of shop orders is known per se in the art and is not part of this invention.

As indicated in FIG. 4, the process of optimization includes two steps. The first step is to lay out a cut pattern and the second step is to define a cut sequence. Pattern optimization is known per se in the art and there are commercially available programs for determining the optimum fit of a plurality of figures within a given outline.

In accordance with the invention, the software proposes a pattern that is then checked in the "cut sequence" portion of the software to compare the pattern with criteria including the preferences provided by an individual operator. If the criteria are not satisfied by a given pattern, the software returns to the layout procedure to produce a new solution to the optimization problem. As indicated by lines 66 and 67 in FIG. 4, this portion of the procedure is re-entrant. That is, the procedure calls itself, passing data between the optimization procedure and the cut sequence procedure until an acceptable solution is found.

It is possible, although not likely, that a solution cannot be found. Re-entrant procedures, if exercised without limit, will eventually cause a computer to stop operating. In order to prevent failure, the number of iterations, or re-entries is monitored and a limit of twenty-five re-entries is imposed. The number twenty-five is arbitrary and depends upon the configuration of a computer, specifically upon the allocated stack space.

On page 4 of Appendix A, line 3840 is the point at which the number of levels is detected and limited to twenty-five. Appendix A is the source code, written in "MegaBasic", for the procedures that control the optimization of the pattern, the cut sequence, and the display. The appendices, all written in "MegaBasic" do not include code relating to set-up or initial conditions such as defining data types, arrays, and tables, providing initial values and the like because such code is well known to skilled programmers.

In Appendix A, the procedure "Optimize_Glazing" calls the procedure "Create_Sub_Plates", see lines 3000 and 3770 of Appendix A. The procedure "Create_Sub_Plates" calls itself; see entry points at lines 4180, 4370, 4430, and 4920. The procedure "Create_Sub_Plates" ends at line 4980.

FIG. 5 illustrates a menu in which an operator named "Charlie" provides data for the computer indicating preferences for horizontal movement, horizontal measurement, type of tool etc., as indicated in the menu. The path from the main menu to the "Charlie" menu is also indicated in FIG. 5. Providing and displaying a menu and storing information obtained from dialogue with a user are well known procedures and are not included in the source code included in the Appendices.

There are basically two types of hand cutting tools used in the glazing industry, a speed cutter, as described above, and a T-square. The T-square is just like the drafting tool of the same name and is used with a hand-held scribe run along the edge of the stem of the T. The choice of cutters depends somewhat upon the type of glass being cut and depends upon the subjective preferences of the worker. A workstation incorporating the invention accommodates both types of tools but the cut pattern and the cut sequence depend on which tools are available. Typically, if a speed cutter is available, then a T-square is also available but not all glass shops use speed cutters.

If a speed cutter is the primary tool, then certain cuts cannot be made, for example, a cut longer than the reach of the speed cutter (the stem of the T). Such cuts should be avoided, if possible, to avoid changing tools in the middle of a pattern. Also, the length of the available T-squares and the number and size of the speed cutters dictate how the cutting sequence must be presented to the worker. Since glass "cutting" actually involves scribing and fracturing the glass, it is difficult to cut a piece having a width less than twice the thickness of the glass. This limit is also included in the criteria for evaluating a pattern. These particulars relate to the application of the invention to glass cutting and are built into the criteria for determining the optimum cut pattern and cut sequence. Different criteria would be used in adapting the invention to other applications. Whatever the application, the invention provides a mechanism for tailoring a manual task to the limits, preferences, and pace of an individual worker.

After a solution to the layout problem is accepted, the cut data is displayed in quantitative and qualitative form as a sequence of tasks; see block 68 in FIG. 4. In FIG. 6, monitor 25 displays the legend "H-53.50" and monitor 24 displays a graphic illustrating the cut as bright, horizontal line 73. Different areas in the graphic are preferably provided with distinct colors identifying the portions of the sheet as product, cutoff, or scrap. In the monochromatic illustration of FIG. 6, areas 71 and 72 are cross-hatched to indicate scrap. The remaining areas are product.

After the cut data is displayed for the operator, the computer enters a wait loop, indicated in FIG. 4 by block 74.

Specifically, the computer is looking for a response from the operator by way of beeper 26 (FIG. 1) or keyboard 22 (FIG. 1). In one embodiment of the invention, either the "return" key on the keyboard or the beeper is used to indicate the successful completion of an operation. The beeper is the primary mechanism for indicating a cut is completed.

The computer interprets a signal from the beeper as an indication that the cut has been successfully completed as directed and proceeds to display the next task. Since the completed cut was the first cut in a sheet of glass containing a plurality of panes, the computer will then display the second cut to separate the first product from the remaining cutoff. As illustrated in FIG. 7, the second cut is a vertical cut 80.75 inches from the right hand end of the sheet. This cut is indicated by bright line 75. Area 71 remains colored (cross-hatched) as scrap and areas 77 and 78 are colored (cross-hatched) as cutoffs.

After the operator actuates the beeper, the software updates internal tables, as indicated by block 76 in FIG. 4, and re-executes pattern optimization to determine the next cut. The optimization takes very little time and is typically transparent to an operator. Even at twenty-four levels of iteration, optimization takes less than one second while running the source code in an interpretive mode. When compiled, the optimization procedure would take approximately one fourth of a second to execute under worst case conditions.

After the vertical cut illustrated in FIG. 7, the computer displays the separated product on monitor 24 and indicates the size and storage location for the product on monitor 25, as illustrated in FIG. 8. Pane 78 is highlighted with bright lines as shown to provide further indication to the worker that the pane is completed. Other highlighting techniques could be used. The storage location shown on monitor 25 is a unique slot within harp rack 16 (FIG. 1). Even though it is the first product from a sheet, the computer knows whether or not the product should be stored in the first slot in the harp rack in order to provide product in an appropriate sequence for subsequent manufacturing operations. The storage sequence is determined in accordance with order entry information forwarded to computer system 20 from an external source.

After additional vertical cuts are made and product is removed, one is left with scrap 71 and the operator knows to place piece 71 in the scrap bin because of its color code in the display, as shown in FIG. 9.

Although the example illustrated in FIGS. 5–9 assumes a stock sheet of glass as the starting material, the same sequence is performed with a cutoff retrieved from rack 18 (FIG. 1). The dimensions of the cutoff are known to the computer, which tracks both product and cutoffs, and the optimization procedures operate on any size starting material.

As a default value, the computer will use both cutoffs and standard inventory, selecting that which produces the best yield. In accordance with the invention, an operator can override the default selection and specify that only standard inventory be used or specify that only cutoffs be used. Using only standard inventory saves time and using only cutoffs quickly reduces the inventory of cutoffs. The choice of source material does not affect subsequent manufacturing operations because the harp rack is loaded in the proper sequence to produce product at the next station.

Appendix B contains the procedures for advising the operator what to do with the piece that was just cut and for storing the size and location of a cutoff. Appendix C contains the procedures for determining dimensions and orientations in a cut pattern. Appendix D contains the procedures for determining whether or not the cut pattern in a viable solution when compared with the criteria including the preferences of an individual worker.

FIG. 10 illustrates a memory map of the data used by the software in accordance with the invention. The storage areas are dynamically allocated by the software and include the cut list, current inventory of stock sheets of glass, current inventory of cutoffs, data on various tools used by an operator, e.g. the reach of a T-square, operator preferences, e.g. right- or left-handedness, reach, location of reference point, and the inventory of product stored in sequence for the next operation. An operator has access to all of this data, listed as catalogues in a menu, in order to correct for errors or breakage.

Problems are accommodated by a "hot key" on the computer keyboard. Depressing the hot key causes the computer to produce a list of possible problems which need to be addressed. In the particular application of glass cutting, such problems include bad breakouts, chipped corners, lost cutoffs, special interruptions, re-cuts and others types of problems. Some problems depend on the status of the cutting process at the time the worker alerts the system that there is a problem. Appendix E is a straightforward procedure for looking for a signal from a beeper or a hot key. The routine is somewhat hardware dependent in that it is intended to interface with an I/O board that receives a signal from receiver 29 (FIG. 1). Appendix F is a procedure for presenting menus to a worker in response to the worker actuating a hot key. The menu items relate specifically to a glass cutting operation. Line 9235 in Appendix E links the I/O procedure in Appendix E to the problem handling procedure in Appendix F.

The invention thus provides a computer assisted, manual workstation adapted to individual workers who work at their own pace performing tasks that are individually optimized for each worker. The system accommodates defects in materials or other problems and tracks inventories of stock, product and cutoffs. The product is stored in sequence in preparation for the next phase of manufacture, further increasing the efficiency of the workplace. The workstation displays information in both qualitative and quantitative fashion to provide unambiguous guidance of each step in the production of goods. Each step is displayed at a pace determined by a worker.

Having thus described the invention, it will be apparent to those of skill in the art that various modifications can be made within the scope of the invention. For example, the criteria for evaluating a pattern can be weighted or placed in hierarchical order. If weighted, the criteria are divided between needs, wants, and "don't care." Needs will always cause a cut sequence to be reconstructed. Wants or preferences will cause a cut sequence to be reconstructed unless there have been too many iterations already, e.g. more than twenty iterations. "Don't care" does not cause a reconstruction of the cut sequence. With hierarchical criteria, low priority criteria are dropped if a cutting solution cannot be found. A system including hierarchical or a weighted criteria could have a limit on the number of iterations less than twenty-five.

Data embedded in the program as part of an instruction can be stored in memory as data, and vice-versa. The choice depends upon how much flexibility one wants to give to an operator. For example, the number of iterations before the system gives up trying to optimize a pattern could be stored in RAM and be accessible to an operator through a set-up or configuration menu. A hardware modification to a computer to provide separate RAM for a memory stack would increase the size of the stack and increase the number of iterations that could be made safely.

In one embodiment of the invention, the beeper has a single key and emits a CW signal. A beeper could have more than one key and emit modulated signals which would then be distinguishable, e.g. to provide a hot key capability at the beeper rather than at the keyboard. The location of the monitors is a matter of preference. The first monitor need not be located immediately adjacent the CPU.

While described in the context of a glass cutting facility, the invention can be used in other applications, such as manual fabrication and assembly and manual machining operations. The term "manual workstation" is not intended to mean that only manual tools are used, e.g. a scribe, hammer, or handsaw. Manually controlled power tools appropriate for the particular goods can be used.

```
3000 Def shared proc OPTIMIZE_GLAZING
        PRODUCT_CODE$,OPT_CHOICE,@INSTRUCTIONS$ 3003 DETERMINE_PORT 'errfile.dat',err_port; If filesize(err_port)=0 then Write
        #err_port,%0,4; Read #err_port,%0,err_pt
3010 INIT_CATALOGS; LAST_COMMAND$=""; initialize_stat_data; TOTAL_STORED=0;
        ADD(0)=0
3020 CLS; NO_OF_WINDOWS=0; DETERMINE_PORT "TEMPDATA.DAT",TDATAPORT;
        Rem THIS PORT IS USED WITH THE FORTRAN OPTIMIZER
3030 DETERMINE_PORT 'OPTIMIZE.DAT',OPTport
3040 Read #OPTport,%0,@litems,@numstock
3050 DETERMINE_PORT 'PLGRAFMF.DAT',GRAFPORT
3060 DETERMINE_PORT 'glassord.dat',gport
3065 SET_UP_CUTOFF_INVENTORY_DATA PRODUCT_CODE$; If R1=ESC_KEY or
        R1=TERM_KEY then 3400
3070 resume_suspended_run=0
3090 hotstatus=-1; DISP_MESSAGE 2,' CLICK\ TO START\
        PROGRAM\',hotstatus,INSTRUCTIONS$; If R1=TERM_KEY then 3400
3120 ABORT_OPTIMIZATION_PROBLEM=0
3170 restart_pt:
3180 LAST_PATTERN=0; storing_standard_patterns=(LOAD_SINGLE_STOCK=1 or
        LOAD_SINGLE_STOCK=2)
3190 recalling_standard_stock_patterns=0; restart_optimization=0; R1=1;
        COMPLETE_sub_plate=0; COMPLETE_pattern=0; NO_MORE_PIECES=0;
        next_pattern_stored=0; last_pattern_stored=0; COUNTER$=Z$*2;
        SHEET_WIDTH_ON_TABLE=0; SHEET_HEIGHT_ON_TABLE=0
3200 RESERVED_STOCK$=Z$*4; last_pt=1
3210 C9=6; DETERMINE_PORT 'stanpatt.dat',stock_pattern_port; Write
        #stock_pattern_port,%0,C9,@0
3220 INITIALIZE
3230 Dim pieces_used$(1,4*litems)
3240 Read #TDATAPORT,%274,@min_yield; target_yield=min_yield/100;
        t_yield=target_yield; Rem 1/((1/target_yield)-.99999)
3250 Read #TDATAPORT,%384+51-1,&TYPE_OF_GLASS$(1:10)

3280 OPTIMIZE_NEXT_PATTERN:
3290 MSGDATA$=TYPE_OF_GLASS$(1:10)
3300 hotstatus=0; DISP_MESSAGE
        2,'OPTIMIZING\'+TYPE_OF_GLASS$(1:10)+'\',hotstatus,INSTRUCTIONS$,0; If
        R1=TERM_KEY then [UPDATE_STAT_DATA QTY1; Goto 3400]
3320 Vec S_XDIM=CL_XDIM; Vec S_YDIM=CL_YDIM;
        MIN_DIM=min(min_cutoff_dim,MIN_PIECE_DIM)
3330 MIN_PIECE_DIM=1000*UNITS; For L=1 to litems; If QTY1(L)>0 then
        MIN_PIECE_DIM=min(min_d(L),MIN_PIECE_DIM); Next L
3340 If COUNTER$(1,1)=Z$ then [new_opt 0,OPT_CHOICE; If restart_optimization then
        restart_pt; If finish_after_this_pattern then [COUNTER$(1,1)=Z$;
        NO_MORE_PIECES=1; R1=1; Goto 3360]; If R1=TERM_KEY then 3360]
3350 If COUNTER$(2,2)=Z$ and (LOAD_SINGLE_STOCK=2 or (LOAD_SINGLE_STOCK=3
        and (recalling_standard_stock_patterns or STOCK_SIZE_CHANGED))) then [
3352 new_opt 1,OPT_CHOICE; If finish_after_this_pattern then [COUNTER$(2,2):=Z$;
        NO_MORE_PIECES=1; R1=1; Goto 3360]; If restart_optimization then restart_pt]
3360 If len(COUNTER$-Z$)=0 then [R1=1; UPDATE_STAT_DATA QTY1; Goto 3400];
        hotstatus=6
3370 If NO_MORE_PIECES then [R1=1; If len(COUNTER$-Z$)=2 then DISP_MESSAGE
        1+SECOND_MONITOR,'NEXT TO\LAST\PATTERN\',hotstatus,INSTRUCTIONS$
3373 If len(COUNTER$-Z$)=1 then DISP_MESSAGE 1+SECOND_MONITOR,'
        LAST\PATTERN\',hotstatus,INSTRUCTIONS$; If R1=TERM_KEY then [R1=1;
        UPDATE_STAT_DATA QTY1; Goto 3400]]
3380 COMPLETE_pattern=0; COMPLETE_sub_plate=0; no_cuts_been_made=0
```

Appendix A

3390 PATTERN_CHANGED=0; horizontal_dimension=0; vertical_DIMENSION=0; EVERY_THING_OK=1; R1=1; hotstatus=0; cut_pattern COUNTER$
3393 If reoptimize_pre_loaded_sheet then REOPTIMIZE_PRELOADED_SHEET Not COUNTER; TX; NO_OF_WINDOWS=0; If restart_optimization then restart_pt; If finish_after_this_pattern then [COUNTER$=Z$*2; Goto 3360]; Goto OPTIMIZE_NEXT_PATTERN
3400 close_catalogs; Return
3410 Proc end 3413 Def proc store_bad_pattern DATA_TYPE
3415 Write #err_port,%err_pt,DATA_TYPE,COUNTER,NO_OF_PIECES,itrim,htrim,vtrim,MAX_CUTOFF_SIZE,MIN_CUTOFF_SIZE,MIN_PIECE_DIM,VERT_ENHANCEMENT,HORIZ_ENHANCEMENT,max_vert_cut,max_horiz_cut,min_vert_cut,min_horiz_cut,SPEED_CUTTER,MAX_CUT_LENGTH,litems
3416 Write #err_port,vec XLOC,vec YLOC,vec XDIM,vec YDIM,SHEET_WIDTH,SHEET_HEIGHT,vec S_IDENT,vec S_CHAR_ID,vec RESTART_QTY,vec CL_SLOT_NO,SLT_ITM,stk_no,STANDARD_STOCK,MEAS_R_TO_L,MEAS_BOT_TO_TOP,MOVE_R_TO_L
3417 Write #err_port,@len(cross_ref$),&cross_ref$,@len(ALL_RACK_NAMES$),&ALL_RACK_NAMES$,@len(ALL_DIMENSIONS$),&ALL_DIMENSIONS$,&chrseq$(254,255,254)
3418 Return; Proc end 3423 Def proc get_bad_pattern J; Local M,K,W$
3424 M=0; Filepos(err_port)=4
3425 Read #err_port,DATA_TP,COUNTER,NO_OF_PIECES,itrim,htrim,vtrim,MAX_CUTOFF_SIZE,MIN_CUTOFF_SIZE,MIN_PIECE_DIM,VERT_ENHANCEMENT,HORIZ_ENHANCEMENT,max_vert_cut,max_horiz_cut,min_vert_cut,min_horiz_cut,SPEED_CUTTER,MAX_CUT_LENGTH,litems
3426 K=NO_OF_PIECES; Dim XLOC(K),YLOC(K),XDIM(K),YDIM(K),S_IDENT(K),S_CHAR_ID(K),RESTART_QTY(litems),CL_SLOT_NO(litems)
3427 W$=Z$*3; Read #err_port,vec XLOC,vec YLOC,vec XDIM,vec YDIM,SHEET_WIDTH,SHEET_HEIGHT,vec S_IDENT,vec S_CHAR_ID,vec RESTART_QTY,vec CL_SLOT_NO,SLT_ITM,stk_no,STANDARD_STOCK,MEAS_R_TO_L,MEAS_BOT_TO_TOP,MOVE_R_TO_L,@C8
3428 CHK_DIM cross_ref$,C8; Read#err_port,&cross_ref$,@C8; CHK_DIM ALL_RACK_NAMES$,C8; Read #ERR_POT,&ALL_RACK_NAMES$,@C8; CHK_DIM ALL_DIMENSIONS$,C8; Read#err_port,&ALL_DIMENSIONS$,&W$(1,3); If W$(1,3)<>chrseq$(254,255,254) then Stop
3429 M+=1; If M<J then [If filepos(err_port)>err_pt-5 then Stop; Goto 3425]; Return; Proc end 3430 Def proc cut_pattern @COUNTER$
3432 Local MIN_PIECE_DIM
3440 If COUNTER$(last_pt:1)>Z$ then [COUNTER=last_pt-1; COUNTER$(last_pt:1):=Z$] else [If last_pt=1 then M=2 else M=1; If COUNTER$(M:1)>Z$ then [COUNTER=M-1; COUNTER$(M:1):=Z$]]; If last_pt=1 then last_pt=2 else last_pt=1
3450 Vec RESTART_QTY=QTY1; PARTIAL_PATTERN=0; CUTOFFS_STORED$=""; CUTOFFS=0; pieces_stored$=""
3455 RESTART_PATN:INSTRUCTIONS$=""
3456 If err_flag then [get_bad_pattern err_pat; Goto 3466]
3460 GET_PATTERN COUNTER,XLOC,YLOC,XDIM,YDIM,SHEET_WIDTH,SHEET_HEIGHT,S_IDENT,S_CHAR_ID,SLT_ITM,stk_no,STANDARD_STOCK,NO_OF_PIECES -2-    Appendix A

```
3462 If not err_flag then store_bad_pattern 1
3466 no_cuts_been_made=0; LAST_CUTTER_SETTING=0;
     MIN_PIECE_DIM=1000*UNITS; For L=1 to NO_OF_PIECES; If S_IDENT(L)>0 then
     MIN_PIECE_DIM=min(MIN_PIECE_DIM,XDIM(L),YDIM(L)); Next L
3470 stk_height=SHEET_HEIGHT; stk_wid=SHEET_WIDTH
3480 K1=dim(S_IDENT); INVENTORY_NOT_USED=0; Vec QTY1=RESTART_QTY;
     RESTART_PATTERN=0; ABORT_SHEET=0; found_it_flag=0
3481 SET_PIECES_STORED
3520 ENCODE_DIMENSIONS
     XLOC$,YLOC$,XDIM$,YDIM$,XLOC,YLOC,XDIM,YDIM,Dim(XDIM,1)
3530 Rem THIS IS WHERE WE CUT THE PATTERN
3540 hotstatus=3
3550 K1=dim(XLOC,1)
3560 Dim S_XDIM(K1),S_YDIM(K1),S_XLOC(K1),S_YLOC(K1)
3570 Vec S_XDIM=XDIM; Vec S_YDIM=YDIM; Vec S_XLOC=XLOC; Vec S_YLOC=YLOC;
     Rem note s_xdim and s_ydim are the dimensions of the pieces making up the plate
     s_ident is the id of the pieces
3580 CHK_DIM DISPLAY_FLAG$,K1; DISPLAY_FLAG$=chr$(1)*K1
3582 CHK_DIM orig_index$,Dim(XLOC,1); COMPLETE_pattern=0;
     COMPLETE_sub_plate=0
3584 orig_index$=chrseq$(1:dim(XLOC,1))
3590 COMPUTE_SUB_PLATE_WIDTHS
     SUB_PLATE_WIDTHS$,XLOC,YLOC,XDIM,YDIM,orig_index$,"H",SHEET_WIDTH,
     SHEET_HEIGHT,Len(XLOC$) div 4; CUTOFFS=0
3630 A_EQ_B S_ORIG_index$,orig_index$; REMAINING_PATTERN_IS_BAD=0;
     FIRST_VIEW=1; cuts_have_been_made=0
3633 DISP_SEQT+=1; Rem If DISP_SEQT=26 then Stop
3640 PLATE_WIDTH=SHEET_WIDTH; PLATE_HEIGHT=SHEET_HEIGHT;
     CREATE_SUB_PLATES
     "H","V",SHEET_WIDTH,SHEET_HEIGHT,XLOC$,YLOC$,XDIM$,YDIM$,SUB_PLAT
     E_WIDTHS$,RULES$,0,orig_index$
3642 DECODE_DIMENSIONS XLOC$,YLOC$,XDIM$,YDIM$,XLOC,YLOC,XDIM,YDIM
3650 If PATTERN_ERR_FLAG then [Dim DISPLAY_FLAG$(len(orig_index$)); FILLF
     DISPLAY_FLAG$,Chr$(1)
3651 DISPLAY_FLAG$=chr$(1)*len(orig_index$); Vec QTY1=RESTART_QTY; For L=1 to
     len(orig_index$); M=asc(orig_index$(L,L)); J=S_IDENT(M); If J>0 then [If
     T_QTY1(J)>0 then DISPLAY_FLAG$(M,M)=Z$; QTY1(J)-=1]; Next L; disp_glas
     orig_index$,S_IDENT
3660 C$=""; OPEN_WINDOW 1,29,3,79; PID 30; SSTRING R1,C$,R9,"PRESS RETURN
     KEY WHEN FINISHED WITH PATTERN",2,30,4; CLOSE_WINDOW; R1=1; Goto
     3710]
3665 If RESTART_PATTERN then 3690
3670 If not ABORT_SHEET then [update_quantity_cut; update_common_list
     QTY1,CL_XDIM,CL_YDIM]
3680 If cuts_have_been_made then [For L=1 to len(pieces_stored$) div 3; If
     pieces_stored$(1+3*(L-1):1)=Z$ then [If S_IDENT(L)>0 then [ENCODE4
     XDIM(L),W$; ENCODE4 YDIM(L),C$; CONCAT
     stat_broken_pieces$,W$(1,4)+C$(1,4)]]; Next L]
3690 STOCK_SIZE_CHANGED=0; If not cuts_have_been_made then [If R1=TERM_KEY
     and INSTRUCTIONS$(1,4)="TERM" then Return]
3700 If REMAINING_PATTERN_IS_BAD then R1=RETURN_KEY;
     REMAINING_PATTERN_IS_BAD=0; If INSTRUCTIONS$="SKIP TO NEXT
     PATTERN" then R1=1; If RESTART_PATTERN then 3720
3710 PATTERN_ERR_FLAG=0; If not INVENTORY_NOT_USED then [If not
     STANDARD_STOCK then [REMOVE_PIECE_FROM_RACK
     CRACK(stk_no),CSLTID(stk_no),SLT_ITM,stk_no; ENCODE4
     XCUOFF(stk_no),W$; ENCODE4 YCUOFF(stk_no),C$; CONCAT
     STAT_cutoffs_used$,W$(1,4)+C$(1,4)] else [
```

Appendix A

3711 BEST_STOCK_ADDRESS=STANDARD_STOCK; ENCODE4 PLATE_WIDTH,W$;
ENCODE4 PLATE_HEIGHT,C$; CONCAT
STAT_STOCK_USED$,W$(1,4)+C$(1,4); UPDATE_STOCK_INVENTORY 1]]
3714 If R1=TERM_KEY and INSTRUCTIONS$(1,4)="TERM" then Return
3720 If ABORT_SHEET or RESTART_PATTERN then [ABORT_SHEET=0; Vec
QTY1=RESTART_QTY; R1=1; If RESTART_PATTERN then RESTART_PATN]
3730 If TEST then [TOTAL_CUTOFFS+=CUTOFFS;
stock_area+=SHEET_WIDTH*SHEET_HEIGHT; If
abs((good_piece+scrap+TOTAL_CUTOFFS-REAL_SCRAP-
stock_area)/stock_area)>.00001 then Stop; REAL_SCRAP=0]
3740 RESERVED_STOCK$(1+2*COUNTER:2):=Z$*2; COUNTER$(COUNTER+1:1):=Z$;
COMPLETE_sub_plate=0; COMPLETE_pattern=0; PATTERN+=1;
NO_OF_WINDOWS=0; TX; I#OUTPUT_PORT,"END OF PATTERN
"+FSTR$(PATTERN)+" "; Return; Proc end 3770 Def proc CREATE_SUB_PLATES
PLATE_ORIENTATION$,CUT_ORIENTATION$,PLATE_WIDTH,PLATE_HEIGHT,X
LOC$,YLOC$,XDIM$,YDIM$,SUB_PLATE_WIDTHS$,RULES$,LEVEL,orig_index$
3780 Local
C8,C9,COUNT,J,K1,K2,L,M,slt_item,stk_no,STANDARD_STOCK,COMPLETE_su
b_plate,location_of_vertical_cut,base_LOCATION,LHSIDE,RHSIDE
3790 Local
SUB_PLATE_HEIGHT,SUB_PLATE_WIDTH,SUB_PLT_WIDTH,no_of_sub_plates
3800 Local X_LOCATION,Y_LOCATION
3810 Local NXOFF,NYOFF,NO_OF_PIECES
3820 Local
sav_sub_plate_widths$,sub_index$,SUB_PLT_WIDTHS$,temp_sub_plate_widths
$
3830 Local XLO$,YLO$,XDI$,YDI$
3831 PATTERN_CHANGED=0
3834 CUT_SEQT+=1; Rem If CUT_SEQT>41 then Stop
3840 If LEVEL>25 then [display_layout; PID 1; OPEN_WINDOW 1,29,3,79; C$=""; PID 31;
SSTRING R1,C$,R9,"ERROR IN PATTERN. CUT TO COMPLETION ",2,30,4;
CLOSE_WINDOW; R1=TERM_KEY; Vec T_QTY1=RESTART_QTY-QTY1;
PATTERN_ERR_FLAG=1
3842 err_pt=filepos(err_port); Write #err_port,%0,err_pt; Return]
3850 Rem seqt+=1; If seqt>15 then Stop
3851 DECODE_DIMENSIONS XLOC$,YLOC$,XDIM$,YDIM$,XLOC,YLOC,XDIM,YDIM
3852 If LEVEL>22 then [If TEST_RUN=3 then Stop; If len(SUB_PLATE_WIDTHS$)<5 then
[COMPUTE_SUB_PLATE_WIDTHS
SUB_PLATE_WIDTHS$,XLOC,YLOC,XDIM,YDIM,orig_index$,PLATE_ORIENTATI
ON$,PLATE_WIDTH,PLATE_HEIGHT,Len(XLOC$) div 4]]
3860 A_EQ_B sav_sub_plate_widths$,SUB_PLATE_WIDTHS$; A_EQ_B
temp_sub_plate_widths$,SUB_PLATE_WIDTHS$; K1=len(orig_index$);
LEVEL+=1
3870 COUNT=1
3890 NO_OF_PIECES=len(XLOC$) div 4
3892 If min(PLATE_WIDTH,PLATE_HEIGHT)<MIN_CUTOFF_SIZE or
max(PLATE_WIDTH,PLATE_HEIGHT)<MAX_CUTOFF_SIZE then 3906
3895 For L=1 to len(orig_index$); ID=asc(orig_index$(L,L)); If S_IDENT(ID)>0 and
DISPLAY_FLAG$(ID,ID)>Z$ then Exit 3906; Next L
3897 FIND_BEST_OPEN_SLOT_IN_RACK
PRODUCT_CODE$,PLATE_WIDTH,PLATE_HEIGHT,BEST_RACK,BEST_SLOT,B
EST_ITEM,BEST_COLOR_CODE; If BEST_RACK>0 then 3903
3901 J=0; For L=1 to len(orig_index$); K1=asc(orig_index$(L,L)); If
DISPLAY_FLAG$(K1,K1)>Z$ then [
3902 If min(S_XDIM(K1),S_YDIM(K1))>=MIN_CUTOFF_SIZE and
max(S_XDIM(K1),S_YDIM(K1))>=MAX_CUTOFF_SIZE then [J+=1; If J>1 then Exit
3906]]; Next L

```
3903 REDISPLAY_FLAG=1; cut_to_be_completed=0; DISTRIBUTE_PIECE
      -asc(orig_index$(1,1)),0,0,orig_index$; Return
3906 If NO_OTHER_CUTS(orig_index$) then Return
3910 REDISPLAY_FLAG=1
3920 RESTART_THE_PATTERN:
3930 Case begin on PLATE_ORIENTATION$; Rem horizontal plate has vertical cuts &
      vertical plate has horizontal cuts
3940 Case "H"
3960 SUB_PLATE_HEIGHT=PLATE_HEIGHT
3970 PLT_WIDTH=PLATE_WIDTH; no_of_sub_plates=len(SUB_PLATE_WIDTHS$) div 4;
      If no_of_sub_plates=0 then Return
3991 If NO_OF_PIECES=1 then [K1=asc(orig_index$(1,1)); DISTRIBUTE_PIECE
      K1,0,0,orig_index$; Return]; base_LOCATION=0; Rem dwd feb 20 1995
4000 Case begin on vertical_cut_break
4010 Case 1
4020 Case begin on MOVE_R_TO_L
4030 Case 1; base_LOCATION=PLATE_WIDTH; DEC4
      SUB_PLT_WIDTH,SUB_PLATE_WIDTHS$(:4); SUB_PLATE_WIDTHS$(:4):="";
      location_of_vertical_cut=base_LOCATION-SUB_PLT_WIDTH; K1=1;
      LHSIDE=location_of_vertical_cut; RHSIDE=base_LOCATION; left_edge=0;
      right_edge=RHSIDE
4040 Case 0; DEC4 SUB_PLT_WIDTH,SUB_PLATE_WIDTHS$(1:4);
      SUB_PLATE_WIDTHS$(1:4):="";
      location_of_vertical_cut=SUB_PLT_WIDTH+base_LOCATION;
      K1=len(orig_index$); RHSIDE=location_of_vertical_cut; LHSIDE=RHSIDE-
      SUB_PLT_WIDTH
4050 left_edge=base_LOCATION; right_edge=PLATE_WIDTH;
      base_LOCATION+=SUB_PLT_WIDTH
4060 Case end
4070 IDENTIFY_PIECES_IN_SUB_PLATE
      0,SUB_PLATE_HEIGHT,LHSIDE,RHSIDE,XLOC,YLOC,orig_index$,sub_index$
4080 If location_of_vertical_cut=0 or abs(location_of_vertical_cut-
      PLATE_WIDTH)<UNITS/1000 then [If len(sub_index$)=1 then [If
      REDISPLAY_FLAG then display_layout; Goto 4140] else 4170]
4090 If not PATTERN_CHANGED then [
4091 CHECK_SUB_PLATE_FOR_MODIFICATIONS
      PLATE_ORIENTATION$,temp_sub_plate_widths$,XLOC,YLOC,XDIM,YDIM,orig_in
      dex$,location_of_vertical_cut,NO_OF_PIECES,PLATE_WIDTH,PLATE_HEIGHT,P
      ATTERN_CHANGED] Else PATTERN_CHANGED=0
4100 If PATTERN_CHANGED then [SUB_PLATE_WIDTHS$=temp_sub_plate_widths$;
      ENCODE_DIMENSIONS
      XLOC$,YLOC$,XDIM$,YDIM$,XLOC,YLOC,XDIM,YDIM,NO_OF_PIECES; Goto
      RESTART_THE_PATTERN]
4103 vertical_DIMENSION=0
4110 display_layout; If not_drawn then 4140
4130 VERT_DIVIDER location_of_vertical_cut,left_edge,right_edge
4141 flip_dimension=0; If len(sub_index$)=1 then [K1=asc(sub_index$);
      DISTRIBUTE_PIECE K1,LHSIDE,0,sub_index$; If flip_dimension then [R1=1; Goto
      4110]; If reflect_pattern then 4151; If R1=TERM_KEY then Return; Goto 4200] else
4150 [DISP_MESSAGE 0,MSGDATA$,hotstatus,INSTRUCTIONS$] ; MSGDATA$=""; If
      flip_dimension then [R1=1; Goto 4110]; If not reflect_pattern then 4158
4151 R1=1; reflect_pattern=0; A_EQ_B SUB_PLATE_WIDTHS$,temp_sub_plate_widths$
4152 K1=len(SUB_PLATE_WIDTHS$); M=K1-3; For L=1 to (K1 div 2) by 4; DEC4
      C9,SUB_PLATE_WIDTHS$(L:4); If C9>=MIN_PIECE_DIM and M<>L then
      [SWAP_TWO_SUB_PLATES 1+L div 4,1+M div
      4,SUB_PLATE_WIDTHS$,'H',NO_OF_PIECES,XLOC,YLOC; M-=4]; Next L
4155 PATTERN_CHANGED=1; temp_sub_plate_widths$=SUB_PLATE_WIDTHS$
4156 ENCODE_DIMENSIONS
      XLOC$,YLOC$,XDIM$,YDIM$,XLOC,YLOC,XDIM,YDIM,NO_OF_PIECES; Goto
      RESTART_THE_PATTERN
```

```
4158 temp_sub_plate_widths$=SUB_PLATE_WIDTHS$; vertical_DIMENSION=0; If
     R1=TERM_KEY then Return; cuts_have_been_made=1
4170 prepare_vertical_sub_plate
     FLAG,SUB_PLT_WIDTH,LHSIDE,RHSIDE,XLOC$,YLOC$,sub_index$,SUB_PLT_
     WIDTHS$
4180 CREATE_SUB_PLATES
     "V","",SUB_PLT_WIDTH,PLATE_HEIGHT,XLO$,YLO$,XDI$,YDI$,SUB_PLT_WIDT
     HS$,RULES$,LEVEL,sub_index$; If R1=TERM_KEY then Return
4190 DECODE_DIMENSIONS XLOC$,YLOC$,XDIM$,YDIM$,XLOC,YLOC,XDIM,YDIM
4200 LEVEL+=1; temp_sub_plate_widths$=SUB_PLATE_WIDTHS$; If MOVE_R_TO_L
     then PLATE_WIDTH-=SUB_PLT_WIDTH; If len(SUB_PLATE_WIDTHS$)>3 then
     [REDISPLAY_FLAG=1; Goto 4020]; Rem END OF LOGIC
4210 Case 0; If MOVE_R_TO_L then location_of_vertical_cut=PLATE_WIDTH else
     location_of_vertical_cut=0
4220 If len(SUB_PLATE_WIDTHS$)<4 then 4310
4230 Case begin on MOVE_R_TO_L; Rem location of vertical cut measured with respect to
     the total plate_width
4240 Case 1; DEC4 SUB_PLT_WIDTH,SUB_PLATE_WIDTHS$(:4);
     SUB_PLATE_WIDTHS$(:4):=""; location_of_vertical_cut-=SUB_PLT_WIDTH;
     K1=1; LHSIDE=location_of_vertical_cut; RHSIDE=LHSIDE+SUB_PLT_WIDTH
4250 Case 0; DEC4 SUB_PLT_WIDTH,SUB_PLATE_WIDTHS$(1:4);
     SUB_PLATE_WIDTHS$(1:4):=""; location_of_vertical_cut+=SUB_PLT_WIDTH;
     K1=len(DIST_INDEX$); K1=len(DIST_INDEX$); RHSIDE=location_of_vertical_cut;
     LHSIDE=RHSIDE-SUB_PLT_WIDTH
4260 Case end
4270 If location_of_vertical_cut=0 or abs(location_of_vertical_cut-
     PLATE_WIDTH)<UNITS/1000 then 4300; PLT_WIDTH-=SUB_PLT_WIDTH
4280 VERT_DIVIDER location_of_vertical_cut,left_edge,right_edge
4290 DISP_MESSAGE 0,MSGDATA$,hotstatus,INSTRUCTIONS$; MSGDATA$=""; If
     R1=TERM_KEY then Return
4300 Goto 4220
4320 A_EQ_B SUB_PLATE_WIDTHS$,sav_sub_plate_widths$;
     temp_sub_plate_widths$=SUB_PLATE_WIDTHS$
4330 Case begin on MOVE_R_TO_L
4340 Case 0; base_LOCATION=PLATE_WIDTH
4350 DEC4 SUB_PLT_WIDTH,SUB_PLATE_WIDTHS$(:4); location_of_vertical_cut-
     =SUB_PLT_WIDTH; SUB_PLATE_WIDTHS$(:4):=""
4360 prepare_vertical_sub_plate
     FLAG,SUB_PLT_WIDTH,location_of_vertical_cut,base_LOCATION,XLOC$,YLOC$
     ,sub_index$,SUB_PLT_WIDTHS$
4370 CREATE_SUB_PLATES
     "V","",SUB_PLT_WIDTH,PLATE_HEIGHT,XLO$,YLO$,XDI$,YDI$,SUB_PLT_WIDT
     HS$,RULES$,LEVEL,sub_index$; If R1=TERM_KEY then Return
4380 DECODE_DIMENSIONS XLOC$,YLOC$,XDIM$,YDIM$,XLOC,YLOC,XDIM,YDIM
4390 If len(SUB_PLATE_WIDTHS$)>3 then 4350
4400 Case 1; base_LOCATION=0
4410 DEC4 SUB_PLT_WIDTH,SUB_PLATE_WIDTHS$(1:4);
     location_of_vertical_cut+=SUB_PLT_WIDTH; SUB_PLATE_WIDTHS$(1:4):=""
4420 prepare_vertical_sub_plate
     FLAG,SUB_PLT_WIDTH,0,location_of_vertical_cut,XLOC$,YLOC$,sub_index$,SU
     B_PLT_WIDTHS$
4430 CREATE_SUB_PLATES
     "V","",SUB_PLT_WIDTH,PLATE_HEIGHT,XLO$,YLO$,XDI$,YDI$,SUB_PLT_WIDT
     HS$,RULES$,LEVEL,sub_index$; If R1=TERM_KEY then Return
4440 DECODE_DIMENSIONS XLOC$,YLOC$,XDIM$,YDIM$,XLOC,YLOC,XDIM,YDIM
4450 If len(SUB_PLATE_WIDTHS$)>3 then 4410
4460 Case end
4470 Case end
4480 Return
4520 Case "V"
```

Appendix A

```
4560 SUB_PLATE_WIDTH=PLATE_WIDTH
4570 DEC4 SUB_PLATE_HEIGHT,SUB_PLATE_WIDTHS$(1,4)
4580 SUB_PLATE_WIDTHS$(1,4):=""
4610 Rem **** CALC SUBPLATE HEIGHT
4620 X1=PLATE_WIDTH+1/SCALS
4630 If not PATTERN_CHANGED then [
4631 CHECK_SUB_PLATE_FOR_MODIFICATIONS
     PLATE_ORIENTATION$,temp_sub_plate_widths$,XLOC,YLOC,XDIM,YDIM,orig_in
     dex$,LOCATION_OF_CUT,NO_OF_PIECES,PLATE_WIDTH,PLATE_HEIGHT,PAT
     TERN_CHANGED] Else PATTERN_CHANGED=0
4640 If PATTERN_CHANGED then [
4650 SUB_PLATE_WIDTHS$=temp_sub_plate_widths$; ENCODE_DIMENSIONS
     XLOC$,YLOC$,XDIM$,YDIM$,XLOC,YLOC,XDIM,YDIM,NO_OF_PIECES; Goto
     RESTART_THE_PATTERN]
4670 Rem IF TRIM AT TOP AND BOTTOM PIECE IS TALL AND GOOD PIECE ON TOP OF
     BOTTOM PIECE THEN MOVE TRIM TO TOP OF BOTTOM PIECE SHIFT OTHER
     PIECES UP AND ELIM SUB PLATE WIDTH CORRESPONDING TO BOTTOM OF
     TRIM OR TOP OF GOOD PIECE
4675 horizontal_dimension=0
4680 If SUB_PLATE_HEIGHT<PLATE_HEIGHT then [REDISPLAY_FLAG=1;
     HORZ_DIVIDER SUB_PLATE_HEIGHT]
Else MSGDATA$=""; flip_dimension=0; Rem CUT BOTTOM PLATE AND PREPARE TO CUT
     NEXT SUB PLATE
4690 sub_index$=""; K1=len(XLOC$) div 4; CUT_FLAG=0; Dim
     XDI(K1),YDI(K1),XLO(K1),YLO(K1); K1=0
4700 For M=1 to len(XLOC$) by 4
4710 DEC4 C9,YLOC$(M:4)
4720 If C9<SUB_PLATE_HEIGHT-10 and C9>-10 then
4730 [K1+=1; J=1+M div 4
4740 XLO(K1)=XLOC(J); YLO(K1)=YLOC(J)
4750 XDI(K1)=XDIM(J); YDI(K1)=YDIM(J); If min(XDI(K1),YDI(K1))>MIN_CUTOFF_SIZE and
     max(XDI(K1),YDI(K1))>=MAX_CUTOFF_SIZE then CUT_FLAG=1;
     ID=asc(orig_index$(J:1)); If S_IDENT(ID)>0 then CUT_FLAG=1
4760 CONCAT sub_index$,orig_index$(J:1)]
4770 Next M
4791 If len(sub_index$)=1 then [If REDISPLAY_FLAG then display_layout;
     DISTRIBUTE_PIECE Asc(sub_index$(1,1)),0,0,sub_index$;
     horizontal_dimension=0; If flip_dimension then [R1=1; Goto 4680]; If reflect_pattern
     then 4802; If R1=TERM_KEY then Return; Goto 4930]
4800 If len(MSGDATA$)=0 then 4820
4801 DISP_MESSAGE 0,MSGDATA$,hotstatus,INSTRUCTIONS$; MSGDATA$=""; If
     flip_dimension then [R1=1; Goto 4680]; If not reflect_pattern then 4810
4802 reflect_pattern=0; A_EQ_B SUB_PLATE_WIDTHS$,temp_sub_plate_widths$
4804 K1=len(SUB_PLATE_WIDTHS$); L=1; For M=K1-3 to ((K1 div 2)-3) by -4; DEC4
     C9,SUB_PLATE_WIDTHS$(M:4); If C9>MIN_PIECE_DIM and M<>L then
     [SWAP_TWO_SUB_PLATES 1+L div 4,1+M div
     4,SUB_PLATE_WIDTHS$,'V',NO_OF_PIECES,XLOC,YLOC; L+=4]; Next M
4807 R1=1; PATTERN_CHANGED=1; temp_sub_plate_widths$=SUB_PLATE_WIDTHS$
4808 ENCODE_DIMENSIONS
     XLOC$,YLOC$,XDIM$,YDIM$,XLOC,YLOC,XDIM,YDIM,NO_OF_PIECES; Goto
     RESTART_THE_PATTERN
4810 horizontal_dimension=0; If R1=TERM_KEY then Return; cuts_have_been_made=1
4820 K3=len(sub_index$)
4830 For L=1 to K3
4840 K2=asc(sub_index$(L:1)); DISPLAY_FLAG$(K2:1):=chr$(2)
4850 Next L
4860 DRAW_SMALL_VERSION XLOC,XDIM,PLATE_WIDTH,SUB_PLATE_HEIGHT
4870 For L=1 to K3
4880 K2=asc(sub_index$(L:1)); DISPLAY_FLAG$(K2:1):=chr$(1)
4890 Next L
```

```
4900 ENCODE_DIMENSIONS XLO$,YLO$,XDI$,YDI$,XLO,YLO,XDI,YDI,K1
4910 COMPUTE_SUB_PLATE_WIDTHS
     SUB_PLT_WIDTHS$,XLO,YLO,XDI,YDI,sub_index$,'H',PLATE_WIDTH,SUB_PLAT
     E_HEIGHT,K1
4920 CREATE_SUB_PLATES
     "H",CUT_ORIENTATION$,SUB_PLATE_WIDTH,SUB_PLATE_HEIGHT,XLO$,YLO
     $,XDI$,YDI$,SUB_PLT_WIDTHS$,RULES$,LEVEL,sub_index$; If R1=TERM_KEY
     then Return
4930 If len(SUB_PLATE_WIDTHS$)<4 then Return; DECODE_DIMENSIONS
     XLOC$,YLOC$,XDIM$,YDIM$,XLOC,YLOC,XDIM,YDIM
4940 Vec YLOC=YLOC-SUB_PLATE_HEIGHT; For L=1 to dim(YLOC,1); If abs(YLOC(L))<10
     then YLOC(L)=0; Next L; PLATE_HEIGHT-=SUB_PLATE_HEIGHT
4950 ENCODE_DIMENSIONS
     XLOC$,YLOC$,XDIM$,YDIM$,XLOC,YLOC,XDIM,YDIM,Dim(XDIM,1)
4960 temp_sub_plate_widths$=SUB_PLATE_WIDTHS$; If len(SUB_PLATE_WIDTHS$)>3
     then 4570 Else Return
4970 Case end
4980 Return; Proc end 4990 Def func NO_OTHER_CUTS(orig_index$)
5000 Local L,K1,K2
5010 K1=len(orig_index$); If K1>0 then K2=ANY_VALID_PIECE(orig_index$)
5020 For L=1 to K1
5030 ID=asc(orig_index$(L,L))
5040 If DISPLAY_FLAG$(ID,ID)>Z$ then
5050 [If S_IDENT(ID)>0 then Exit 5110
5060 If K2 and K1>1 then Return 0]
5070 Next
5080 If K2 then Return 0
5090 For L=1 to K1; ID=asc(orig_index$(L:1)); DISPLAY_FLAG$(ID,ID):=Z$; Next
5100 Return 1
5110 Return 0; Func end
```

```
6950 Def proc CHOOSE_PIECE ID,QUA,@GLOBAL_ID
6951 Local U$,K1
6953 ENCODE2 ID,U$; K1=find(min cross_ref$>=U$(3,4)+Z$+chr$(QUA),4); If K1>0 then
     GLOBAL_ID=1+(K1 div 4)
6957 Return; Proc end 7040 Def proc DISTRIBUTE_PIECE ID,XPOS,YPOS,@THE_INDEX$
7042 Rem THREE LEVELS OF ID. ID=PLATE ID S_IDENT(ID)=COMPRESSED OPTIMIZED
     GROUP ID AND GLOBAL ID IS PIECE ID FROM CUTLIST
7050 Local
     DX,DY,L,hotstatus,K1,DO_NOT_STORE,ALREADY_STORED,BROKEN_PIECE,dr
     aw_anyway,C9,C8
7054 If ID<0 then 7058; If len(THE_INDEX$)=1 then 7058; C8=0; For L=1 to
     len(THE_INDEX$); K2=asc(THE_INDEX$(L,L)); If asc(DISPLAY_FLAG$(K2:1))>0
     then Next
7055 If S_IDENT(K2)>-1 then Exit 7058;
     C8+=((max(S_XDIM(K2),S_YDIM(K2))>=MAX_CUTOFF_SIZE) and
     (min(S_XDIM(K2),SYDIM(K2))>=MIN_CUTOFF_SIZE)); If C8>1 then Exit 7058; Next
     L
7056 If max(PLATE_HEIGHT,PLATE_WIDTH)>=MAX_CUTOFF_SIZE and
     min(PLATE_HEIGHT,PLATE_WIDTH)>=MIN_CUTOFF_SIZE then ID=-abs(ID)
7058 no_cuts_been_made=0; If REDISPLAY_FLAG and not cut_to_be_completed then
     [draw_anyway=(ID<0); display_layout; REDISPLAY_FLAG=1]; If ID>0 then
     [C9=S_XDIM(ID); C8=S_YDIM(ID)]; A_EQ_B sav_display$,DISPLAY_FLAG$
7060 If ID<0 then [ID=abs(ID); K1=asc(THE_INDEX$(1,1)); C9=PLATE_WIDTH;
     C8=PLATE_HEIGHT; XPOS=0; YPOS=0; For L=2 to len(THE_INDEX$);
     DISPLAY_FLAG$(asc(THE_INDEX$(L,L)):1):=Z$; Next L
7062 BLOCK_OUT 0,0,PLATE_WIDTH,PLATE_HEIGHT,0,SCRN$,0,GREEN; ABSBOX
     0,WHITE,0,0,PLATE_WIDTH,PLATE_HEIGHT]
7064 ALREADY_STORED=0; DO_NOT_STORE=0; BROKEN_PIECE=0; hotstatus=5; If
     S_IDENT(ID)<0 then
7066 [DISPLAY_FLAG$(ID:1):=Z$; hotstatus=4
7090 If min(C9,C8)<MIN_CUTOFF_SIZE or max(C9,C8)<MAX_CUTOFF_SIZE then [
7091 If not cut_to_be_completed then Return else [REDISPLAY_FLAG=1;
     DISP_MESSAGE 2,MSGDATA$,hotstatus,INSTRUCTIONS$; MSGDATA$=""; If
     NO_OF_WINDOWS>0 then NO_OF_WINDOWS-=1; Return]]]
7100 ABSLINE 0,WHITE,XPOS,YPOS,XPOS+C9,YPOS+C8; REDISPLAY_FLAG=1
7110 ABSLINE 0,WHITE,XPOS,YPOS+C8,XPOS+C9,YPOS
7120 DY=-YDOT; DX=-XDOT
7130 For L=1 to 3
7140 ABSLINE 0,WHITE,XPOS,YPOS+C8/2+DY,XPOS+C9,YPOS+C8/2+DY
7150 ABSLINE 0,WHITE,XPOS+C9/2+DX,YPOS,XPOS+C9/2+DX,YPOS+C8
7160 DY+=YDOT; DX+=XDOT
7170 Next
7172 X_MIDPT=XPOS+C9/2; Y_MIDPT=YPOS+C8/2; BOX_WID=C9; BOX_HT=C8;
     XBLC=XPOS; YBLC=YPOS
7180 HEIGHT=max(C9,C8); WIDTH=min(C9,C8)
7190 Case begin on S_IDENT(ID)
7200 Case <0
7210 ENCODE4 WIDTH,W$; ENCODE4 HEIGHT,C$;
     K=find(CUTOFFS_STORED$=chrseq$(ID,K2,LEVEL)+W$(1,4)+C$(1,4),14); If K
     then [W$=CUTOFFS_STORED$(K+11:3); BEST_RACK=asc(W$(1,1));
     BEST_SLOT=asc(C$(2,2)); BEST_ITEM=asc(C$(3,3)); ALREADY_STORED=1;
     Goto 7225]
7220 NEW_CUTOFF$=chrseq$(ID,K2,LEVEL)+W$(1,4)+C$(1,4)
7225 STORE_THE_CUTOFF WIDTH,HEIGHT,ALREADY_STORED
7230 If R1=TERM_KEY and (flip_dimension or reflect_pattern) then [A_EQ_B
     DISPLAY_FLAG$,sav_display$; Return]
7245 If DO_NOT_STORE or ALREADY_STORED then 7290
```

Appendix B

```
7248 CUTOFFS= S_XDIM(ID); CUTOFFS*=S_YDIM(ID); GLASS_HAS_BEEN_CUT=1
7290 Case>0
7292 If pieces_stored$(1+3*(ID-1):1)=Z$ then CHOOSE_PIECE
     S_IDENT(ID),1,GLOBAL_ID else DECODE2 GLOBAL_ID,pieces_stored$(2+3*(ID-
     1):2)
7295 K1=len(MSGDATA$)+1;
     C$=trim$(EXTRACT$(ALL_RACK_NAMES$,CL_RACK_NO(GLOBAL_ID),chr$(250
     ))+"-"+FSTR$(CL_SLOT_NO(GLOBAL_ID))); CONCAT
     MSGDATA$,C$+"\"+FSTR$(int(WIDTH/UNITS))+" x
     "+FSTR$(int(HEIGHT/UNITS))+"\"
7301 If not SECOND_MONITOR then rack_image
     Trim$(C$(1,7)),BLUE,WHITE,X_MIDPT,Y_MIDPT
7302 PRINT_TEXT_AT XPIXEL(X_MIDPT),YPIXEL(Y_MIDPT),C$,"C",0,0,WHITE,SCRN$
7320 If SECOND_MONITOR then disp_trac GLOBAL_ID
7330 TOTAL_STORED+=1; good_piece+=WIDTH*1.*HEIGHT
7340 DISP_MESSAGE 2,MSGDATA$,hotstatus,INSTRUCTIONS$; MSGDATA$=""; If
     NO_OF_WINDOWS>0 then NO_OF_WINDOWS-=1; If R1=TERM_KEY then Return;
     cuts_have_been_made=1
7350 ENCODE4 WIDTH,W$; ENCODE4 HEIGHT,C$
7351 If not BROKEN_PIECE then [If pieces_stored$(1+3*(ID-1):1)=Z$ then [CONCAT
     STAT_PIECES_STORED$,W$(1,4)+C$(1,4); GLASS_HAS_BEEN_CUT=1
7352 ENCODE2 GLOBAL_ID,U$; pieces_stored$(1+3*(ID-1):3):=chr$(1)+U$(3,4);
     UPDATE_PIECE_DATA 0,GLOBAL_ID,-1]; PARTIAL_PATTERN=1]
7370 Case end
7380 cut_to_be_completed=0; If R1=TERM_KEY then Return
7390 DISPLAY_FLAG$(ID:1):=Z$; MSGDATA$=""
7400 Return; Proc end 7422 Def proc STORE_THE_CUTOFF WIDTH,HEIGHT,ALREADY_STORED
7423 Local C9,L,j0,SEC_ATRIB
7424 SEC_ATRIB=135; If ALREADY_STORED then 7436
7426 R1=1; CUTOFF_NOT_STORED=0; FIND_BEST_OPEN_SLOT_IN_RACK
     PRODUCT_CODE$,WIDTH,HEIGHT,BEST_RACK,BEST_SLOT,BEST_ITEM,BES
     T_COLOR_CODE
7430 C$=trim$(str$(int(HEIGHT/UNITS),'9F1Z'))+"X"+trim$(str$(int(WIDTH/UNITS),'9F1Z'))
7432 If XPOS=0 and YPOS=0 and GRAPHICS then PRINT_GRAPHIC_TEXT C$,.4,.5,9.37-
     .5*len(C$),7.1-.7
7433 If BEST_RACK>0 then
     TXT$=trim$(EXTRACT$(CUTOFF_RACK_NAMES$,BEST_RACK,chr$(250))) else
     TXT$="UNK"; TXT$(4):=""; TXT$(:0):="-"
7434 CONCAT TXT$,FSTR$(BEST_SLOT); If GRAPHICS then [PRINT_TEXT_AT
     XPIXEL(X_MIDPT),YPIXEL(Y_MIDPT),TXT$,"C",0,0,WHITE,SCRN$; If not
     SECOND_MONITOR then rack_image TXT$,GREEN,BLUE,X_MIDPT,Y_MIDPT]
7435 If BEST_RACK>0 then
     C$=EXTRACT$(CUTOFF_RACK_NAMES$,BEST_RACK,chr$(250)) else
     C$="UNK"; C$(4):=""; CONCAT C$,"-"
7436 If len(MSGDATA$)=0 then CONCAT MSGDATA$,'PUT CUTOFF\'; CONCAT
     MSGDATA$,C$(1,5)+FSTR$(BEST_SLOT)+'-
     '+FSTR$(BEST_ITEM)+'\'+FRAC$(int(HEIGHT/UNITS))+'x'+FRAC$(int(WIDTH/UNIT
     S))
7437 NO_RACK=(BEST_RACK=0); DISP_MESSAGE 2,MSGDATA$,4,INSTRUCTIONS$;
     MSGDATA$=""; If DO_NOT_STORE then Return; If R1=TERM_KEY and
     INSTRUCTIONS$="CUTOFF RESIZED" then [R1=1; INSTRUCTIONS$=""; Goto
     7424]
7438 If NO_RACK and BEST_RACK then [R1=1; Goto 7430]; If not ALREADY_STORED
     and CUTOFF_NOT_STORED then 7426; If R1=TERM_KEY then Return
7439 If BEST_RACK>0 and ALREADY_STORED then Return; If BEST_RACK=0 then
     GET_RACK_ADDRESS
```

```
      BEST_RACK,BEST_SLOT,BEST_ITEM,PRODUCT_CODE$,WIDTH,HEIGHT; If
      R1=ESC_KEY then 7426; If R1=TERM_KEY then Return
7440 CONCAT NEW_CUTOFF$,Chrseq$(BEST_RACK,BEST_SLOT,BEST_ITEM)
7442 If DO_NOT_STORE or ALREADY_STORED then Return
7445 If BEST_RACK>0 and BEST_SLOT>0 then STORE_PIECE_IN_RACK
      BEST_RACK,BEST_SLOT,BEST_ITEM,PRODUCT_CODE$,Min(WIDTH,HEIGHT),
      max(WIDTH,HEIGHT) else [ENCODE4 WIDTH,W$; ENCODE4 HEIGHT,C$; CONCAT
      stat_cutoffs_not_stored$,W$(1,4)+C$(1,4)]
7447 CONCAT CUTOFFS_STORED$,NEW_CUTOFF$
7470 Return; Proc end
```

Appendix B

```
308 Def func contains_good_piece(PLATE_TYPE$,c7,c6,J)
309 Local L; ID=0; Rem ID IDENTIFIES GOOD PIECE
310 If c7>c6 then Swap c7,c6; Case begin on PLATE_TYPE$
311 Case "H"; For L=1 to no_of_pieces; If SIDENT(L)>=J then [If outside$(L,L)=Z$ then
        [ID=L; If XLOC(L)>c7-ERRK and XLOC(L)<c6-ERRK then Return 1]]; Next L
312 Case "V"; For L=1 to no_of_pieces; If SIDENT(L)>=J then [If outside$(L,L)=Z$ then
        [ID=L; If YLOC(L)>c7-ERRK and YLOC(L)<c6-ERRK then Return 1]]; Next L
313 Case end
314 Return 0; Func end 316 Def func CONTAINS_DROP(PLATE_TYPE$,c7,c6)
317 Local L,rc9; ID=0; Rem ID IDENTIFIES DROP PIECE
318 area=0; If c7>c6 then Swap c7,c6; Case begin on PLATE_TYPE$
319 Case "H"; For L=1 to no_of_pieces; If SIDENT(L)=0 then [If outside$(L,L)=Z$ then [ID=L;
        If XLOC(L)>c7-ERRK and XLOC(L)<c6-ERRK then Return 1]]; If SIDENT(L)>0 and
        outside$(L,L)=Z$ then [rc9=XDIM(L); area=max(rc9*YDIM(L))]; Next L
320 Case "V"; For L=1 to no_of_pieces; If SIDENT(L)=0 then [If outside$(L,L)=Z$ then [ID=L;
        If YLOC(L)>c7-ERRK and YLOC(L)<c6-ERRK then Return 1]]; If SIDENT(L)>0 and
        outside$(L,L)=Z$ then [rc9=XDIM(L); area=max(rc9*YDIM(L))]; Next L
321 Case end
322 Return 0; Func end 324 Def func CONTAINS_ONE_GOOD_PIECE(PLATE_TYPE$,c7,c6)
325 Local L; ID=0; Rem ID IDENTIFIES DROP PIECE
326 If c7>c6 then Swap c7,c6; Case begin on PLATE_TYPE$
327 Case "H"; For L=1 to no_of_pieces; If SIDENT(L)>0 then [If outside$(L,L)=Z$ then [If
        XLOC(L)>c7-ERRK and XLOC(L)<c6-ERRK then [If ID>0 then Return 0; ID=L]]]; Next
        L
328 Case "V"; For L=1 to no_of_pieces; If SIDENT(L)=0 then [If outside$(L,L)=Z$ then [If
        YLOC(L)>c7-ERRK and YLOC(L)<c6-ERRK then [If ID>0 then Return 0; ID=L]]]; Next
        L
329 Case end
330 Return 1; Func end 345 Def shared proc SWAP_TWO_SUB_PLATES
        I,J,@SUB_PLATE_WIDTHS$,PLATE_TYPE$,no_of_pieces,@XLOC,@YLOC
346 CHK_DIM outside$,no_of_pieces; swap_sub_plates I,J; Return; Proc end 350 Def proc swap_sub_plates I,J
351 Local L,M,c9,c6,c7,K,c8,K1,c9$,C8$,C$
352 no_of_sub_plates=len(SUB_PLATE_WIDTHS$) div 4; Dim
        XPOS(no_of_sub_plates+1); For L=1 to len(SUB_PLATE_WIDTHS$) by 4; DEC4
        c9,SUB_PLATE_WIDTHS$(L:4); M=1+(L-1) div 4; XPOS(M+1)=XPOS(M)+c9; Next L
354 Swap SUB_PLATE_WIDTHS$(1+4*(I-1):4),SUB_PLATE_WIDTHS$(1+4*(J-1):4);
        CHK_DIM C$,no_of_pieces; PATTERN_CHANGED=1; Case begin on
        PLATE_TYPE$
358 Case "H"; For M=1 to no_of_pieces; If outside$(M,M)=Z$ then [For K=1 to
        no_of_sub_plates; If XLOC(M)>XPOS(K)-ERRK and XLOC(M)<XPOS(K+1)-ERRK
        then [XLOC(M)-=XPOS(K); C$(M,M):=chr$(K); Exit]; Next K]; Next M
359 C$=tran$(C$,chr$(I),chr$(255)); C$=tran$(C$,chr$(J),chr$(I));
        C$=tran$(C$,chr$(255),chr$(J))
360 For M=1 to no_of_pieces; If outside$(M,M)=Z$ then [c6=0; For K=1 to
        no_of_sub_plates; If K=asc(C$(M,M)) then [XLOC(M)+=c6; Exit]; DEC4
        c7,SUB_PLATE_WIDTHS$(1+4*(K-1):4); c6+=c7; Next K]; Next M
368 Case "V"
369 For M=1 to no_of_pieces; If outside$(M,M)=Z$ then [For K=1 to no_of_sub_plates; If
        YLOC(M)>XPOS(K)-ERRK and YLOC(M)<XPOS(K+1)-ERRK then [YLOC(M)-
        =XPOS(K); C$(M,M)=chr$(K); Exit]; Next K]; Next M
370 C$=tran$(C$,chr$(I),chr$(255)); C$=tran$(C$,chr$(J),chr$(I));
        C$=tran$(C$,chr$(255),chr$(J))
```

Appendix C

```
371 For M=1 to no_of_pieces; If outside$(M,M)=Z$ then [c6=0; For K=1 to
    no_of_sub_plates; If K=asc(C$(M,M)) then [YLOC(M)+=c6; Exit]; DEC4
    c7,SUB_PLATE_WIDTHS$(1+4*(K-1):4); c6+=c7; Next K]; Next M
378 Case end
383 Return; Proc end 390 Def shared proc initialize_stat_data
391 C$=time$; don$=C$; start_time=NVAL(C$)*60; K1=match(C$,":");
    start_time+=NVAL(C$(K1+1))
392 STAT_PIECES_STORED$=""; stat_cutoffs_stored$=""; stat_cutoffs_not_found$="";
    STAT_PIECES_STORED$=""; stat_broken_pieces$="";
    STAT_STOCK_USED$=""; STAT_cutoffs_used$=""; stat_cutoffs_not_stored$=""
393 Return; Proc end 400 Def proc check_for_scrap_sub_plates ORIENTATION$
401 Local L,K,M,J
405 If len(SUB_PLATE_WIDTHS$)<8 then Return
410 Case begin on ORIENTATION$
415 Case "H"
420 M=0; K=0; c7=0; For L=1 to len(SUB_PLATE_WIDTHS$) by 4; DEC4
    c9,SUB_PLATE_WIDTHS$(L:4); c9+=c7
425 If contains_good_piece(PLATE_TYPE$,c7,c9,0) then 435
431 If M=0 then [M=L; MIN_M_LOC=c7; MAX_M_LOC=c9] else [K=L; MIN_K_LOC=c7;
    MAX_K_LOC=c9]; If K>0 then Exit 455
435 c7=c9; Next L; If M=0 then Return
440 c7=0; For L=1 to len(SUB_PLATE_WIDTHS$) by 4; DEC4
    c9,SUB_PLATE_WIDTHS$(L:4); c9+=c7
445 If contains_good_piece(PLATE_TYPE$,c7,c9,1) then 450; If L=M then 450; K=L;
    MIN_K_LOC=c7; MAX_K_LOC=c9; Exit 455
450 c7=c9; Next L; Return
455 DEC4 c9,SUB_PLATE_WIDTHS$(M:4); DEC4 c8,SUB_PLATE_WIDTHS$(K:4); ENC4
    c9+c8,W$; WID=c9+c8; If MAX_K_LOC<MAX_M_LOC then [Swap
    MAX_K_LOC,MAX_M_LOC; Swap MIN_K_LOC,MIN_M_LOC]
456 For J=1 to no_of_pieces; If asc(outside$(J,J)) then Next
457 If XLOC(J)>MAX_K_LOC-ERRK then Next
458 If XLOC(J)>MIN_K_LOC-ERRK then [XLOC(J)=XLOC(J)-MIN_K_LOC; Goto 470]
459 If XLOC(J)>MAX_M_LOC-ERRK then [XLOC(J)+=(MAX_K_LOC-MIN_K_LOC); Goto
    470]
462 If XLOC(J)>MIN_M_LOC-ERRK then [XLOC(J)+=(MAX_K_LOC-MIN_K_LOC-
    MIN_M_LOC); Goto 470]
465 If XLOC(J)<MIN_M_LOC-ERRK then XLOC(J)+=WID
470 Next J
485 PATTERN_CHANGED=1; SUB_PLATE_WIDTHS$(max(K,M):4):="";
    SUB_PLATE_WIDTHS$(min(K,M):4):=""; SUB_PLATE_WIDTHS$(1:0):=W$(1,4); If
    len(SUB_PLATE_WIDTHS$)>4 then 420 Else Return
500 Case "V"
503 M=0; K=0; c7=0; For L=1 to len(SUB_PLATE_WIDTHS$) by 4; DEC4
    c9,SUB_PLATE_WIDTHS$(L:4); c9+=c7
508 If contains_good_piece(PLATE_TYPE$,c7,c9,0) then 518
511 If M=0 then [M=L; MIN_M_LOC=c7; MAX_M_LOC=c9] else [K=L; MIN_K_LOC=c7;
    MAX_K_LOC=c9]
513 If K=M then 518; If K>0 then Exit 538
518 c7=c9; Next L; If M=0 then Return
523 c7=0; For L=1 to len(SUB_PLATE_WIDTHS$) by 4; DEC4
    c9,SUB_PLATE_WIDTHS$(L:4); c9+=c7
528 If M=L then 533; If contains_good_piece(PLATE_TYPE$,c7,c9,1) then 533; K=L;
    MIN_K_LOC=c7; MAX_K_LOC=c9; Exit 538
533 c7=c9; Next L; Return
```

-2-                                                                    Appendix C

```
538 DEC4 c9,SUB_PLATE_WIDTHS$(M:4); DEC4 c8,SUB_PLATE_WIDTHS$(K:4); ENC4
    c9+c8,W$; WID=c9+c8; If MAX_K_LOC<MAX_M_LOC then [Swap
    MAX_K_LOC,MAX_M_LOC; Swap MIN_K_LOC,MIN_M_LOC]
550 For J=1 to no_of_pieces; If asc(outside$(J,J)) then Next
551 If YLOC(J)<MIN_M_LOC-ERRK then Next
552 If YLOC(J)>MIN_K_LOC-ERRK and YLOC(J)<MAX_K_LOC-ERRK then
    [YLOC(J)=PLATE_HEIGHT-MAX_K_LOC+YLOC(J); Goto 556]
553 If YLOC(J)>MAX_M_LOC-ERRK and YLOC(J)<MIN_K_LOC-ERRK then [YLOC(J)-
    =(MAX_M_LOC-MIN_M_LOC); Goto 556]
554 If YLOC(J)>MAX_K_LOC-ERRK then [YLOC(J)-=WID; Goto 556]
555 If YLOC(J)>MIN_M_LOC-ERRK then [YLOC(J)=PLATE_HEIGHT-WID+(YLOC(J)-
    MIN_M_LOC); Goto 556]
556 Next J
568 PATTERN_CHANGED=1; SUB_PLATE_WIDTHS$(max(K,M):4):="";
    SUB_PLATE_WIDTHS$(min(K,M):4):=""
575 CONCAT SUB_PLATE_WIDTHS$,W$(1,4); If len(SUB_PLATE_WIDTHS$)>4 then 503
597 Case end
598 Return; Proc end 600 Def proc stuff_single_piece
    xlo,ylo,SHEET_WIDTH,SHEET_HEIGHT,L,@t_qty1,@grids$,@s_area,@SXDIM,@
    SYDIM
610 Local blk_width,blk_height,J,M,c8,c9,rc9,rc8
620 dh1=0; dh2=0; DW1=0; DW2=0; NH1=0; NH2=0; NW1=0; NW2=0; AREA1=0;
    AREA2=0
630 If SXDIM(L)<=SHEET_WIDTH-xlo and SYDIM(L)<=SHEET_HEIGHT-ylo then [
640 form_grid SHEET_WIDTH-xlo,SHEET_HEIGHT-
    ylo,SXDIM(L),SYDIM(L),t_qty1(L),blk_width,blk_height,no_vert,no_horiz;
    DW1=SHEET_WIDTH-blk_width-xlo; dh1=SHEET_HEIGHT-blk_height-ylo;
    NH1=no_vert; NW1=no_horiz; AREA1=NH1*NW1*piece_area(L)
650 If dh1>=min_cutoff_dim then [TOP_X1=SHEET_WIDTH-xlo; RIGHT_Y1=blk_height]
    else [TOP_X1=blk_width; RIGHT_Y1=SHEET_HEIGHT-ylo]]
660 If SYDIM(L)<=SHEET_WIDTH-xlo and SXDIM(L)<=SHEET_HEIGHT-ylo then [
670 form_grid SHEET_WIDTH-xlo,SHEET_HEIGHT-
    ylo,SYDIM(L),SXDIM(L),t_qty1(L),blk_width,blk_height,no_vert,no_horiz;
    DW2=SHEET_WIDTH-blk_width-xlo; dh2=SHEET_HEIGHT-blk_height-ylo;
    NH2=no_vert; NW2=no_horiz; AREA2=NW2*NH2*piece_area(L)
680 If dh2>=min_cutoff_dim then [TOP_X2=SHEET_WIDTH-xlo; RIGHT_Y2=blk_height]
    else [TOP_X2=blk_width; RIGHT_Y2=SHEET_HEIGHT-ylo]]
690 If (NH2=0 or NW2=0) and (NH1=0 or NW1=0) then [ENCODE4 xlo,W$; ENCODE4
    ylo,u$; CONCAT grids$,Z$+W$(1,4)+u$(1,4)+Z$; ENCODE4 SHEET_WIDTH-
    xlo,W$; ENCODE4 SHEET_HEIGHT-ylo,u$; CONCAT
    grids$,W$(1,4)+u$(1,4)+chrseq$(252,251); Return]
700 If NW2*NH2>NH1*NW1 then [blk_width=NW2*SYDIM(L); blk_height=NH2*SXDIM(L); If
    SHEET_HEIGHT-blk_height-xlo>min_cutoff_dim then [TOP_X2=SHEET_WIDTH-
    xlo; RIGHT_Y2=blk_height] else [TOP_X2=blk_width; RIGHT_Y2=SHEET_HEIGHT-
    ylo]]
710 If NW2*NH2<NH1*NW1 then [blk_width=NW1*SXDIM(L); blk_height=NH1*SYDIM(L); If
    SHEET_HEIGHT-blk_height-xlo>min_cutoff_dim then [TOP_X1=SHEET_WIDTH-
    xlo; RIGHT_Y1=blk_height] else [TOP_X1=blk_width; RIGHT_Y1=SHEET_HEIGHT-
    ylo]]
720 If NW2*NH2=NW1*NH1 then [rc8=NH1*SYDIM(L)+ylo; rc9=SHEET_HEIGHT-rc8; If
    rc9>min_cutoff_dim then AREA1+=rc9*(SHEET_WIDTH-xlo); rc8=SHEET_HEIGHT-
    ylo; rc9=SHEET_WIDTH-NW1*SXDIM(L)-xlo; If rc9>min_cutoff_dim then
    AREA1+=rc9*rc8
730 AREA2=0; rc8=NH2*SXDIM(L)+ylo; rc9=SHEET_HEIGHT-rc8; If rc9>min_cutoff_dim
    then AREA2+=rc9*(SHEET_WIDTH-xlo); rc8=SHEET_HEIGHT-ylo;
    rc9=SHEET_WIDTH-NW2*SYDIM(L)-xlo; If rc9>min_cutoff_dim then
    AREA2+=rc9*rc8]
```

```
740 If AREA1>AREA2 then [c9=ylo; For J=1 to NH1; c8=xlo; For M=1 to NW1; ENCODE4
       c8,W$; ENCODE4 c9,u$; CONCAT
       grids$,Z$+W$(1,4)+u$(1,4)+chr$(L)+chrseq$(252,251); c8+=SXDIM(L);
       s_area+=piece_area(L); t_qty1(L)-=1
750 Next M; c9+=SYDIM(L); Next J; c8=NH1*SYDIM(L)+ylo; If SHEET_HEIGHT>c8 then
       [ENCODE4 c8,W$; ENCODE4 xlo,V$; CONCAT grids$,Z$+V$(1,4)+W$(1,4)+Z$;
       ENCODE4 TOP_X1,C$; ENCODE4 SHEET_HEIGHT-c8,C8$; CONCAT
       grids$,C$(1,4)+C8$(1,4)+chrseq$(252,251)]
760 c8=NW1*SXDIM(L)+xlo; If SHEET_WIDTH>c8 then [ENCODE4 c8,C$; ENCODE4
       ylo,V$; CONCAT grids$,Z$+C$(1,4)+V$(1,4)+Z$; ENCODE4 RIGHT_Y1,C8$;
       ENCODE4 SHEET_WIDTH-c8,W$; CONCAT
       grids$,W$(1,4)+C8$(1,4)+chrseq$(252,251)]]
770 If AREA1<=AREA2 then [c9=ylo; For J=1 to NH2; c8=xlo; For M=1 to NW2; ENCODE4
       c8,W$; ENCODE4 c9,u$; CONCAT
       grids$,Chr$(1)+W$(1,4)+u$(1,4)+chr$(L)+chrseq$(252,251); c8+=SYDIM(L);
       s_area+=piece_area(L); t_qty1(L)-=1
780 Next M; c9+=SXDIM(L); Next J; c8=ylo+NH2*SXDIM(L); If SHEET_HEIGHT>c8 then
       [ENCODE4 c8,W$; ENCODE4 xlo,V$; CONCAT grids$,Z$+V$(1,4)+W$(1,4)+Z$;
       ENCODE4 TOP_X2,C$; ENCODE4 SHEET_HEIGHT-c8,C8$; CONCAT
       grids$,C$(1,4)+C8$(1,4)+chrseq$(252,251)]
790 c8=NW2*SYDIM(L)+xlo; If SHEET_WIDTH>c8 then [ENCODE4 c8,C$; ENCODE4
       ylo,V$; CONCAT grids$,Z$+C$(1,4)+V$(1,4)+Z$; ENCODE4 RIGHT_Y2,C8$;
       ENCODE4 SHEET_WIDTH-c8,W$; CONCAT
       grids$,W$(1,4)+C8$(1,4)+chrseq$(252,251)]]
800 Return; Proc end 890 Def shared proc DRA ; draw_grid
       grids$,SXDIM,SYDIM,SHEET_WIDTH,SHEET_HEIGHT; Return; Proc end
```

Appendix C

```
904 Rem A HORIZONTAL ORIENTATION MEANS SUB PLATES STACKED SIDE BY SIDE A
    VERTICAL OREINTATION MEANS SUB PLATES STACKED ONE ON TOP OF
    ANOTHER
910 Rem
920 Def shared proc CHECK_SUB_PLATE_FOR_MODIFICATIONS
    @PLATE_TYPE$,@SUB_PLATE_WIDTHS$,@XLOC,@YLOC,@XDIM,@YDIM,@or
    ig_index$,@LOCATION_OF_CUT,@no_of_pieces,@PLATE_WIDTH,@PLATE_H
    EIGHT,@PATTERN_CHANGED
930 Local SUB_PLT_WIDTHS$,VERT_ENHANCEMENT,HORIZ_ENHANCEMENT
932 seqt+=1; Rem If seqt>53 then Stop
940 If len(SUB_PLATE_WIDTHS$)<8 or LEVEL>19 then Return
960 PATTERN_CHANGED=0; Dim SIDENT(no_of_pieces); If not STANDARD_STOCK or
    LEVEL>17 then [VERT_ENHANCEMENT=0; HORIZ_ENHANCEMENT=0]
970 K2=0; CHK_DIM outside$,no_of_pieces; For L=1 to no_of_pieces;
    K1=asc(orig_index$(L,L)); SIDENT(L)=S_IDENT(K1); If SIDENT(L)>0 then K2+=1; If
    max(XDIM(L),YDIM(L))>=MAX_CUTOFF_SIZE and
    min(XDIM(L),YDIM(L))>=MIN_CUTOFF_SIZE then SIDENT(L)=max(0,SIDENT(L))
972 If YLOC(L)<0 or YLOC(L)>=PLATE_HEIGHT-ERRK or XLOC(L)<-ERRK or
    XLOC(L)>PLATE_WIDTH-ERRK then outside$(L,L):=chr$(1); Next L
990 check_for_scrap_sub_plates PLATE_TYPE$
997 no_of_sub_plates=len(SUB_PLATE_WIDTHS$) div 4; If no_of_sub_plates<2 then
    Return
1000 Rem max_horiz_cut=58*UNITS
1010 Rem C8 IS THE DIMENISON TO BE DISPLAYED
1014 LL=max(min(MIN_PIECE_DIM,min_cutoff_dim),min_vert_cut); K1=no_of_sub_plates-
    1
1020 Case begin on PLATE_TYPE$
1030 Case "H"; Rem VERTICAL CUT ABOUT TO BE MADE
1080 DEC4 c8,SUB_PLATE_WIDTHS$(:4); c7=PLATE_WIDTH; If LEVEL<8 then [A_EQ_B
    c9$,SUB_PLATE_WIDTHS$; C$=c9$(:4); c9$=rev$(c9$); C$=rev$(C$); If not
    find(c9$>C$,4) then [If CONTAINS_ONE_GOOD_PIECE(PLATE_TYPE$,c7-c8,c7)
    then 1110]]
1083 rc8=0; M=0; For L=no_of_sub_plates to 1 by -1; DEC4
    c6,SUB_PLATE_WIDTHS$(1+4*(L-1):4)
1084 If contains_good_piece(PLATE_TYPE$,c7-c6,c7,1) then [If not
    CONTAINS_DROP(PLATE_TYPE$,c7-c6,c7) and area>rc8 then [rc8=area; M=L]];
    c7-=c6; Next L; If M>0 and M<>(K1+1) then [swap_sub_plates K1+1,M]
1110 If not VERT_ENHANCEMENT or PATTERN_CHANGED then 1320
1180 DEC4 c9,SUB_PLATE_WIDTHS$(:4)
1190 Case begin on c9
1200 Case >max_vert_cut
1310 Case end
1313 Rem THE SECTION BELOW ATTEMPTS TO STACK COMMON SUBPLATES
    TOGETHER THEN COMBINE IN ONE SUB PLATE TO USE COMMON CUTTING
    DIMENSION
1320 COUNT=0; If max(vec SIDENT)<1 then 1400;
    no_of_sub_plates=len(SUB_PLATE_WIDTHS$) div 4; If no_of_sub_plates<2 then
    1400
1322 DEC4 c9,SUB_PLATE_WIDTHS$(:4); If c9>max_vert_cut then 1400
1325 c7=PLATE_WIDTH-c9; For J=1 to no_of_pieces
1326 If SIDENT(J)>0 then [If outside$(J,J)=Z$ then [If abs(XLOC(J)-c7)<ERRK then
    COUNT+=1 else If abs(XLOC(J)-c7)<itrim then [ENC4 PLATE_WIDTH,W$;
    SUB_PLATE_WIDTHS$=W$(1,4); PATTERN_CHANGED=2; Return]]]
1330 Next J
1332 If COUNT<2 then 1400
1333 check_vertical_cut
    XLOC,YLOC,XDIM,YDIM,SIDENT,outside$,no_of_pieces,PLATE_WIDTH,PLATE_
    HEIGHT,no_of_sub_plates,FLAG,PLATE_WIDTH-c9; If not FLAG then 1400
1353 no_cuts_been_made=LEVEL
1365 Goto 1928
```

Appendix D

```
1400 Rem THIS MAKES SURE THE RIGHT MOST PLATE IS VALID. WESTERN WANTS
     THIS BECAUSE STOCK SHEETS MAY NOT BE EXACT
1401 DEC4 c9,SUB_PLATE_WIDTHS$(:4); c8=PLATE_WIDTH-c9; If
     contains_good_piece(PLATE_TYPE$,c8,PLATE_WIDTH,1) then 1408
1403 M=0; c7=0; c8=PLATE_WIDTH; For L=1 to len(SUB_PLATE_WIDTHS$) by 4; DEC4
     c9,SUB_PLATE_WIDTHS$(L:4); If c9<c8 then [If
     contains_good_piece(PLATE_TYPE$,c7,c7+c9,1) then [c8=c9; M=L]]; c7+=c9;
     Next L; If M>0 then swap_sub_plates M,Len(SUB_PLATE_WIDTHS$) div 4
1408 Rem
1410 Case "V"; Rem HORIZONTAL CUT ABOUT TO TO BE MADE
1420 Rem CHECK TO SEE IF TALL HORIZONTAL CUT
1425 DEC4 c8,SUB_PLATE_WIDTHS$(1:4); c7=PLATE_HEIGHT; If LEVEL<8 then
     [A_EQ_B c9$,SUB_PLATE_WIDTHS$; C$=c9$(1,4); c9$=rev$(c9$); C$=rev$(C$);
     If not find(c9$>C$,4) then [If CONTAINS_ONE_GOOD_PIECE(PLATE_TYPE$,0,c8)
     then 1500]]

1426 Rem FIRST MAKE SURE BOTTOM PLATE IS NARROWEST WITH VALID PIECE
1430 rc8=0; M=0; c7=0; For L=1 to no_of_sub_plates; DEC4
     c6,SUB_PLATE_WIDTHS$(1+4*(L-1):4)
1431 If contains_good_piece(PLATE_TYPE$,c7,c7+c6,1) then [If not
     CONTAINS_DROP(PLATE_TYPE$,c7,c7+c6) and area>rc8 then [rc8=area; M=L]];
     c7+=c6; Next L; If M>0 and M>1 then [swap_sub_plates 1,M]
1570 If len(SUB_PLATE_WIDTHS$)<8 then Return
1574 DEC4 c8,SUB_PLATE_WIDTHS$(1:4)
1580 Case begin on c8
1590 Case >max_horiz_cut
1603 Rem PUT IN NARROWEST SCRAP SUB PLATE ALONG BOTTOM IF SUB PLATE
     WIDTH IS TOO HIGH
1820 Case end
1830 If max(vec SIDENT)<1 then 1910; DEC4 c9,SUB_PLATE_WIDTHS$(1,4); If
     c9>max_horiz_cut then 1910
1840 COUNT=0; For J=1 to no_of_pieces; If outside$(J:1)<>Z$ then Next
1850 If SIDENT(J)>0 then [If abs(YLOC(J)+YDIM(J)-c9)<ERRK then COUNT+=1 else [If
     abs(YLOC(J)+YDIM(J)-c9)<itrim then [ENC4 PLATE_HEIGHT,W$;
     SUB_PLATE_WIDTHS$=W$(1,4); PATTERN_CHANGED=2; Return]]]
1855 Next J
1857 If COUNT>1 then [check_horizontal_cut
     XLOC,YLOC,XDIM,YDIM,SIDENT,outside$,no_of_pieces,PLATE_WIDTH,PLATE_
     HEIGHT,no_of_sub_plates,FLAG,c9; If not FLAG then 1910
1860 no_cuts_been_made=LEVEL; Goto 1928]
1912 DEC4 c9,SUB_PLATE_WIDTHS$(1,4)
1913 For J=1 to no_of_pieces; If outside$(J,J)<>Z$ then Next; If YLOC(J)<c9-ERRK and
     YLOC(J)>-ERRK and SIDENT(J)>0 then Exit 1918; Next J
1914 For J=1 to no_of_pieces; If outside$(J,J)<>Z$ then Next; YLOC(J)-=c9; If YLOC(J)<-
     ERRK then YLOC(J)+=PLATE_HEIGHT; Next J; W$=SUB_PLATE_WIDTHS$(1,4);
     SUB_PLATE_WIDTHS$(1,4):=""; SUB_PLATE_WIDTHS$(:0):=W$(1,4);
     PATTERN_CHANGED=1
1920 Case end; Rem ON SUB PLATE TYPE
1925 c9=PATTERN_CHANGED; LOOK_AT_PATTERN
     PATTERN_CHANGED,XLOC,YLOC,XDIM,YDIM,orig_index$,SIDENT,PLATE_WIDT
     H,PLATE_HEIGHT,no_of_pieces,PLATE_TYPE$,SUB_PLATE_WIDTHS$; If
     PATTERN_CHANGED<>c9 then no_cuts_been_made=LEVEL
1928 If PATTERN_CHANGED then [For L=1 to no_of_pieces; If abs(XLOC(L))<10 then
     XLOC(L)=0; If abs(YLOC(L))<10 then YLOC(L)=0; Next L]
1930 Return; Proc end
```

```
9200 Def proc READDIO
9205 Local
        K1,C9$,NO_WINDOW_BORDER,BACKGRND,XCOLOR,RESTORE_FLAG,NO_WI
        NDOW_BORDER
9210 If TEST_RUN=3 then Return
9212 If len(Est_Time$-Z$-" ")>2 then
[C9=NO_WINDOW_BORDER; NO_WINDOW_BORDER=1; OPEN_WINDOW 17,63,24,80;
SPRINT 18,67,ATRIB,"Estimated",-5; SPRINT 19,67,ATRIB,"Remaining",-5;
SPRINT 20,63,ATRIB,Chr$(199)+chr$(196)*16+chr$(182),-5
9213 SPRINT 21,64,ATRIB,Est_Time$,-5; SPRINT 22,64,ATRIB,Est_Shts$,-5;
SPRINT 23,64,ATRIB,Est_Area$,-5; NO_WINDOW_BORDER=C9]
9214 BACKGRND=RED; XCOLOR=RED
9215 Repeat
9220 If COMPLETE_sub_plate or COMPLETE_pattern then [hotkey=4; Goto 9310]
9225 If not GRAPHICS then [NO_WINDOW_BORDER=1; C9=not C9; OPEN_WINDOW
        23,38,24+C9,42-C9]
9230 If RETRACE then [Read #19,&J$(1:); If J$(1:)=chr$(254) then [RETRACE=0;
        C9=filepos(19); Filepos(19)=C9-1; Goto 9230]; If STEP_MODE then TRACE_AID
        J$(1:); A$=J$(1:); If match('Mm',A$) then Stop]
9235 Else [A$=inchr$(0,1,",0,.2); If A$<>" then [If match("Mm",A$) then
        [err_pt=filepos(err_port); Write #err_port,%0,err_pt]; Write #19,&A$(1:);
        cpos=filepos(19); Write #19,&chr$(254); Filepos(19)=cpos]
9240 K1=inp(PORTA); If K1<>clicker_value then [Write #19,&chr$(13); cpos=filepos(19);
        Write #19,&chr$(254); Filepos(19)=cpos; Exit]]
9245 If not GRAPHICS then [CLOSE_WINDOW; NO_WINDOW_BORDER=0]
9250 Next if not match(chrseq$(13,32,80,112),A$)
9255 If TEST_RUN=1 and hotstatus=3 then [COMPLETE_pattern=1;
        INSTRUCTIONS$="SKIP TO NEXT PATTERN"; Goto 9310]
9260 If match('Pp',A$) then [HOT_MENU; If R1=TERM_KEY then Goto 9310; If
        len(INSTRUCTIONS$)>0 then Return; Goto 9215 else [If A$=chr$(13) then 9310]
9265 RESTORE_FLAG=0; If GRAPHICS then [RESTORE_FLAG=1; COPY_SCREEN 0];
        CURSOR 1,1; !chr$(7); GENERAL_WINDOW 5,10,20,70,SCRN$
9270 Repeat
9275 Out PORTB,1 ; Rem RESET MODULE TO RECEIVE A NEW SIGNAL
9280 Wait .05
9285 Out PORTB,0
9290 Wait .05
9295 C9=inp(PORTA)
9300 Next if clicker_value<>C9
9305 If not RESTORE_FLAG then CLOSE_GENERAL_WINDOW SCRN$ Else
        RESTORE_SCREEN
9310 If len(Est_Time$-Z$-" ")>2 then
[CLOSE_WINDOW; Est_Time$=""; Est_Shts$=""; Est_Area$=""];
Return; Proc end
```

Appendix E

```
13060 Def proc HOT_MENU
13070 Local
        col,row,BACKGRND,XCOLOR,hotstatus,SAV_STK,K1,stk_no,STANDARD_STOC
        K,DO_NOT_STORE_PATTERN,stk_wid,stk_height,L,M,C9,C9$,SHEET_HEIGHT,
        SHEET_WIDTH,DISPLAY_FLAG$,RESTORE_FLAG,NO_OF_PIECES,MIN_PIECE
        _DIM
13080 RECUTS_ENTERED=0; BROKEN_PIECE=0; If hotstatus<0 then Return
13090 C$=' Hotkey Menu '; DO_NOT_STORE=0; BACKGRND=0; XCOLOR=0; hotkey=1
13091 first_list$='Continue With Current Data\\Misc Utilities (enter recuts,review
        patterns,pieces etc)\'
13092 If requesting_stock then [CONCAT first_list$,'Temporarily Suspend Optimization
        Run\'; If (STANDARD_STOCK=3 and LOAD_SINGLE_STOCK=3) or
        LOAD_SINGLE_STOCK=2 then CONCAT first_list$,'Complete Current Pattern Then
        Quit\']
13093 CONCAT first_list$,'Display Past Messages\Terminate Run and Return To Main Menu\'
13094 second_list$='Enter Recuts\Review Current Cut List\'; If not
        match(chrseq$(3,4,5),chr$(hotstatus)) then CONCAT second_list$,'Modify Or
        Review Entire Cut List (all products)\'
13095 CONCAT second_list$,'Review Next Pattern\Review Previous Pattern\Review Cutoff
        Inventory\Remove Odd Cutoffs From Racks\Load odd Cutoffs Into Racks\'
13096 problems$=second_list$
13100 Case begin on hotstatus
13110 Case 6; Rem LAST PATTERN
13150 Case 1; Rem select cutoff inventory
13160 problems$='Cutoff Not Found (Reselect From Cutoff Inventory)\Modify Cutoff
        Dimensions\Choose Different Cutoff From Racks\'; C$="Problems With Cutoff";
        INSERT C$,first_list$,2,"\"
13190 Case 2; Rem select from main inventory
13200 problems$='STOCK SHEET NOT FOUND (Reselect From Standard
        Inventory)\STOCK SHEET NOT FOUND (Reselect From Cutoff Inventory)\Stock
        Sheet Damaged: Set New Dimensions\'; C$="Problems With Standard Stock Sheet";
        INSERT C$,first_list$,2,"\"
13230 Case 3; Rem cutting in process
13240 problems$='Restart The Current Pattern\Skip To Next Subplate\Skip To Next
        Pattern\Abort The Remaining Pieces (Bad Breakout)\'; C$="Problems and Special
        Instructions\"; INSERT C$,first_list$,2,"\"
13242 Goto 13342
13290 Case 4; Rem STORING CUTOFF
13300 problems$='Slot specified is not suitable\Cutoff To Be Stored Is Not Usable\Cutoff
        Dimensions Must Be Changed Before Storing\Cutoff too big, Create Multiple Sizes\';
        C$="Problems With Cutoff To Be Stored"; INSERT C$,first_list$,2,"\"
13302 Goto 13342
13330 Case 5; Rem STORING GOOD PIECE
13340 problems$ ='Piece Must Be Recut\Abort The Remaining Pieces (Bad Breakout)\Slot
        Designated Is Full\Skip To Next Subplate\Skip To Next Pattern\Restart The Current
        Pattern\'; C$="Problems & Special Commands"; INSERT C$,first_list$,2,"\"
13342 If vertical_DIMENSION or horizontal_dimension then CONCAT problems$,"Reverse
        The Cut Display\"; If vertical_DIMENSION then CONCAT problems$,"Flip Pattern
        About Vert Axis\"; If horizontal_dimension then CONCAT problems$,"Flip Pattern
        About Horiz Axis\"
13370 Case
13380 Case end
13382 K1=match(first_list$,"\\"); If K1 then first_list$(K1:1):=""
13390 row=1; col=15
13410 hotkey=1; INSTRUCTIONS$=""; PID 5; WINDOW_MENU
        first_list$,row,col,ATTR,2,hotkey,C$;
        C$=UPCASE$(EXTRACT$(first_list$,hotkey,"\"))
13414 If hotkey=1 or R1=END_KEY or R1=TERM_KEY or R1=ESC_KEY then Return; If
        hotkey=0 then 13410
13420 Case begin on hotkey
```

Appendix F

```
13422 Case >3; Goto 13470
13424 Case 2; C9$=problems$
13426 Case 3; If C$="TEMPORARILY SUSPEND OPTIMIZATION RUN" then 13470;
      C9$=second_list$
13428 Case end
13430 CONCAT C9$,"RETURN TO PRIOR MENU\"; hotkey=1; PID 28; WINDOW_MENU
      C9$,row,col,ATTR,2,hotkey,C$; C$=UPCASE$(EXTRACT$(C9$,hotkey,"\"))
13434 If hotkey=COUNT_(C9$,asc("\")) then 13410; If R1=END_KEY then 13410; If
      R1=TERM_KEY then Return; If R1=ESC_KEY then 13410
13470 INSTRUCTIONS$=C$
13520 Case begin on INSTRUCTIONS$
13521 Case "COMPLETE CURRENT PATTERN THEN QUIT"; R1=TERM_KEY;
      finish_after_this_pattern=1; Return"
13522 Case "DISPLAY PAST MESSAGES"
13523 K1=find(LAST_COMMAND$="\",-1,50); If K1>0 then LAST_COMMAND$(1,K1):="";
      If GRAPHICS then [COPY_SCREEN 1; RESTORE_FLAG=1];
      C9=COUNT_(LAST_COMMAND$,asc("\")); PID 6; DISPLAY_LIST "PRIOR
      COMMANDS",LAST_COMMAND$,C9,2,50,2,0,0
13524 If RESTORE_FLAG then RESTORE_SCREEN; Goto 13410
13526 Case "TERMINATE RUN AND RETURN TO MAIN MENU" ;
      INSTRUCTIONS$="TERMINATE THE RUN"; COUNTER$=Z$*2; R1=TERM_KEY;
      Return
13530 Case "PIECE MUST BE RECUT"; BACKGRND=RED; Rem bad breakout
13540 OPEN_WINDOW 10,5,14,75; C9$="Y"; PID 7; SSTRING R1,C9$,R9,"DO YOU WISH
      TO MAKE IT A CUTOFF AND STORE IT ? (Y OR N) ",11,6,4; CLOSE_WINDOW
13550 If R1=TERM_KEY then Return; If R1=RETURN_KEY or C9$="Y" then 13560; If
      R1=ESC_KEY then 13090; If C9$<>"N" then 13540 Else 13580
13560 If GRAPHICS then [COPY_SCREEN 1; RESTORE_FLAG=1] else
      RESTORE_FLAG=0
13570 CREATE_CUTOFFS WIDTH,HEIGHT; BEST_RACK=BEST_RK; If RESTORE_FLAG
      then RESTORE_SCREEN; RESTORE_FLAG=0; If R1=TERM_KEY then Return; If
      R1=ESC_KEY then 13090
13580 BROKEN_PIECE=1
13590 EVERY_THING_OK=0; If COUNTER$(1+(not COUNTER):1)>Z$ then
      reoptimize_pre_loaded_sheet=1; Return; Rem reoptimize next sheet after
      completing this pattern
13595 Case "REVERSE THE CUT DISPLAY"; flip_dimension=1; R1=TERM_KEY; Return
13600 Case "SLOT DESIGNATED IS FULL" ; PID 8; DISPLAY_LIST "PIECE
      DISTRIBUTION",STORAGE_LIST$,RESPONSE,2,30,2,0,0
13610 Case "SKIP TO NEXT SUBPLATE" ; COMPLETE_sub_plate=1; Return
13620 Case "SKIP TO NEXT PATTERN" ; COMPLETE_pattern=1; Return
13630 Case "FLIP PATTERN ABOUT HORIZ AXIS"; reflect_pattern=1; R1=TERM_KEY;
      Return
13632 Case "FLIP PATTERN ABOUT VERT AXIS"; reflect_pattern=1; R1=TERM_KEY;
      Return
13640 Case "REMAINING PIECES ARE BAD" ; REMAINING_PATTERN_IS_BAD=1;
      R1=TERM_KEY; Goto 13590
13672 Case "REMOVE ODD CUTOFFS FROM RACKS" ; remove_cutoff_from_rack
      RESERVED_STOCK$
13710 Case "ENTER RECUTS" ; enter_recuts
13720 Case "MODIFY OR REVIEW ENTIRE CUT LIST (ALL PRODUCTS)" ; access_cut_list
      litems,ALL_ITEMS,gport,QTY1,QTYV,0; INSTRUCTIONS$=""; Rem modify cutlist
13730 If COUNTER$(1+not COUNTER:1)>Z$ then REOPTIMIZE_PRELOADED_SHEET
      Not COUNTER
13740 Case "REVIEW CUTOFF INVENTORY" ; REVIEW_CUTOFF_INVENTORY
      STRIP$(PRODUCT_CODE$)
13750 Case "REVIEW NEXT PATTERN"
13760 Case begin on requesting_stock
13770 Case 1; Goto 13810
```

Appendix F

```
13780 Case 0; If LOAD_SINGLE_STOCK=1 then 13800; If COUNTER$(1+not
      COUNTER:1)<>Z$ then 13810
13790 Case end
13800 PID 9; MESAGE "NO PATTERN AVAILABLE"; Goto 13860; C9=3
13811 GET_PATTERN
      C9,SXLOC,SYLOC,SXDIM,SYDIM,SHEET_WIDTH,SHEET_HEIGHT,SIDENT,SCHA
      R_ID,SLTITM,stkno,stan_stk,NO_OF_PIECES; CHK_DIM
      DISPLAY_FLAG$,Dim(SXDIM,1); FILLF DISPLAY_FLAG$,Chr$(1)
13820 OPEN_WINDOW 1,1,25,80; CHK_DIM C9$,Dim(SXLOC,1);
      C9$=chrseq$(1:dim(SXLOC,1)); DRAW_PLATE
      SIDENT,SXLOC,SYLOC,SXDIM,SYDIM,C9$,SHEET_WIDTH,SHEET_HEIGHT,1,64,
      28; j0=4; disp_glas C9$,SIDENT
13830 C$=trim$(str$(SHEET_WIDTH/UNITS,'9F3'));
      W$=trim$(str$(SHEET_HEIGHT/UNITS,'9F3'))
13840 If C$(:)="0" then [C$(:):=""; Goto 13840]; If W$(:)="0" then [W$(:):=""; Goto 13840]; If
      C$(:)="." then C$(:):=""; If W$(:)="." then W$(:):=""
13850 CONCAT C$,"X"+W$; PRINT_GRAPHIC_TEXT C$,.4,.7,9.375-.7*len(C$),6.0;
      PAUSE; TX; CLOSE_WINDOW
13870 Case "REVIEW PREVIOUS PATTERN" ; If not last_pattern_stored then [PID 10;
      MESAGE "NO PATTERN AVAILABLE "; Goto 13860]; C9=2; Goto 13811; Rem
      review last pattern
13880 Case "REVIEW CURRENT CUT LIST"
13890 C9$=""; For L=1 to litems; CONCAT C9$,"item "+str$(L,'3i3')+") QTY TO
      CUT="+str$(QTY1(L),'3i3')+" "+str$(CL_XDIM(L)/UNITS,'9f3')+" x
      "+str$(CL_YDIM(L)/UNITS,'9f3')+"\"; Next L
13900 If GRAPHICS then [COPY_SCREEN 1; RESTORE_FLAG=1]; PID 11; DISPLAY_LIST
      "PIECES TO BE CUT",C9$,C9,2,2,2,0,0; INSTRUCTIONS$=""; If RESTORE_FLAG
      then RESTORE_SCREEN; RESTORE_FLAG=0; If R1=TERM_KEY then Return
13910 Case "CUTOFF NOT FOUND (RESELECT FROM CUTOFF INVENTORY)" ;
      found_it_flag=0; PID 12; MESAGE 'cutoff removed from rack in data file';
      INSTRUCTIONS$="CUTOFF NOT FOUND"; Return; Rem cutoff not found
13920 Case "MODIFY CUTOFF DIMENSIONS" ; Rem modify cutoff size
13930 REDIMENSION_FULL_SHEET 1; found_it_flag=1
13940 If R1=ESC_KEY then 13090; If R1=TERM_KEY then Return
13950 Case "CHOOSE DIFFERENT CUTOFF FROM RACKS" ; CSLTITEM(stk_no)=0;
      stk_no=0; INSTRUCTIONS$="NEW STOCK"; found_it_flag=0; Return
13955 Case "TEMPORARILY SUSPEND OPTIMIZATION RUN" ; If SUSPENDED_RUN then
      [PID 29; MESAGE "PRIOR RUN ALREADY IN SUSPENSION "; Goto 13080];
      COUNTER$=Z$*2; SUSPEND_THE_RUN=1; R1=TERM_KEY;
      INSTRUCTIONS$="TERMINATE RUN"; Return
14000 Case "STOCK SHEET NOT FOUND (RESELECT FROM STANDARD INVENTORY)"
14001 TERMINATE_MESSAGE; Return
14007 UPDATE_STOCK_INVENTORY 99999; new_opt COUNTER,OPT_CHOICE;
      INSTRUCTIONS$="DELETE ANY INVENTORY OF THIS SIZE\CHOOSE ANOTHER
      STOCK SIZE\OPTIMIZE NEW PIECE\"
14008 Case "STOCK SHEET NOT FOUND (RESELCT FROM CUTOFF INVENTORY)"
14009 Goto 14001
14010 UPDATE_STOCK_INVENTORY 99999; new_opt COUNTER,2;
      INSTRUCTIONS$="DELETE ANY INVENTORY OF THIS SIZE\CHOOSE A
      CUTOFF\OPTIMIZE NEW PIECE\"
14020 Case "STOCK SHEET DAMAGED: SET NEW DIMENSIONS" ; Rem redimension
      standard stock
14030 REDIMENSION_FULL_SHEET 2; found_it_flag=1
14040 If R1=ESC_KEY then 13090; If R1=TERM_KEY then Return
14090 Case "ABORT THE REMAINING PIECES (BAD BREAKOUT)" ; Rem abort sheet and
      start optimization again
14100 If PARTIAL_PATTERN then [K1=OK_TO("RECUT THOSE PIECES THAT WERE
      ALREADY STORED ? (Y OR N) "); If R1=ESC_KEY then 13090; If R1=TERM_KEY
      then Return; If not K1 then [SET_PIECES_STORED; Vec RESTART_QTY=QTY1;
      cuts_have_been_made=0]]
```

Appendix F

14102 If not STANDARD_STOCK then C$="CUTOFF" else C$="STANDARD"
14110 K1=OK_TO("REMOVE RAW SHEET FROM "+C$+" INVENTORY ? (Y/N) "); If
       R1=TERM_KEY then Return; If R1=ESC_KEY then [If PARTIAL_PATTERN then
       14100 Else 13090]; If K1 then INVENTORY_NOT_USED=0 else
       INVENTORY_NOT_USED=1
14120 If COUNTER$(1+not COUNTER:1)>Z$ then [REOPTIMIZE_PRELOADED_SHEET
       Not COUNTER; Return]
14130 R1=TERM_KEY; ABORT_SHEET=1; EVERY_THING_OK=0; Return
14140 Case "RESTART THE CURRENT PATTERN"; R1=TERM_KEY;
       RESTART_PATTERN=1; cuts_have_been_made=0; PIECES_CUT$="";
       INVENTORY_NOT_USED=1; Return; Rem restart current pattern
14170 Case "STOCK SHEET IS DAMAGED: SET NEW SIZE" ; Rem stock sheet is damaged
       discoverd when cutting begins
14180 REDIMENSION_FULL_SHEET 0; found_it_flag=1; Rem the 0 flag indicates we are
       cutting a pattern as opposed to requesting a stock item
14190 If R1=ESC_KEY then 13090; If R1=TERM_KEY then Return
14230 Case "LOAD ODD CUTOFFS INTO RACKS"
14231 If GRAPHICS then [COPY_SCREEN 1; RESTORE_FLAG=1] else
       RESTORE_FLAG=0; CREATE_CUTOFFS 100*UNITS,100*UNITS; If
       RESTORE_FLAG then RESTORE_SCREEN; RESTORE_FLAG=0
14280 Rem slot speicifed is not suitable, store cutoff somewhere else
14290 Case "SLOT SPECIFIED IS NOT SUITABLE"
14291 If BEST_RACK>0 then FILL_SLOT BEST_RACK,BEST_SLOT Else
       [GET_RACK_ADDRESS
       BEST_RACK,BEST_SLOT,BEST_ITEM,PRODUCT_CODE$,WIDTH,HEIGHT; If
       R1=ESC_KEY then 13090; If R1=TERM_KEY then 13090; If BEST_RACK>0 then
       [R1=TERM_KEY; Return]]
14300 BELL 1; CUTOFF_NOT_STORED=1; Return
14310 Case "CUTOFF TO BE STORED IS NOT USABLE"
14311 ENCODE4 WIDTH,W$; ENCODE4 HEIGHT,C$; CONCAT
       stat_cutoffs_not_stored$,W$(1,4)+C$(1,4); DO_NOT_STORE=1;
       INSTRUCTIONS$= 'CUTOFF WILL NOT BE STORED'; PID 13; MESAGE
       INSTRUCTIONS$; Return; Rem cutoff is not usable
14320 Rem case 4 change cutoff dimensions
14328 Case "CUTOFF DIMENSIONS MUST BE CHANGED BEFORE STORING"
14330 C$="NEW DIMENSIONS"; C8$="WIDTH\HEIGHT\"; RVAL(1)=WIDTH/UNITS;
       RVAL(2)=HEIGHT/UNITS; Vec LO_LIM=1; Vec UP_LIM=200;
       IDENTIFIERS$="ENTER NEW DIMENSIONS "*2;
       NUMERICAL_WINDOW_DATA_ENTRY
       C$,C8$,RVAL,LO_LIM,UP_LIM,4,50,8,BLUE
14340 If R1=ESC_KEY then 13090; If R1=TERM_KEY then Return
14350 WIDTH=RVAL(1)*UNITS; HEIGHT=RVAL(2)*UNITS; If WIDTH>HEIGHT then Swap
       WIDTH,HEIGHT; CUTOFF_NOT_STORED=1; INSTRUCTIONS$="CUTOFF
       RESIZED"; R1=TERM_KEY; Return
14360 Case "CUTOFF TOO BIG, CREATE MULTIPLE SIZES" ; Rem cut up cutoff to smaller
       pieces
14370 If GRAPHICS then [COPY_SCREEN 1; RESTORE_FLAG=1] else
       RESTORE_FLAG=0
14380 CREATE_CUTOFFS WIDTH,HEIGHT; BEST_RACK=BEST_RK; If RESTORE_FLAG
       then RESTORE_SCREEN; RESTORE_FLAG=0; If R1<>ESC_KEY and
       ALREADY_STORED then Return
14430 Case end
14450 Goto 13090; Proc end

What is claimed as the invention is:

1. A process for providing computer assistance to a person at a manual workstation for manufacturing goods, the process comprising the steps of:
   a) defining a task for the manufacture of the goods and storing data representative of the task in the memory of the computer as task data;
   b) displaying the task data on a video monitor for viewing by the person by;
      (i) separating the task data into qualitative data and quantitative data;
      (ii) displaying the qualitative data on a first video monitor; and
      (iii) displaying the quantitative data on a second video monitor;
   c) awaiting an input from the person to the computer indicating that the task was completed; and
   d) after the input is received, either returning to step a) or terminating the process.

2. The process as set forth in claim 1 wherein the computer includes a keyboard and said step of awaiting an input includes the step of:
   interrupting said process when a predetermined key in the keyboard is actuated.

3. A process for providing computer assistance to a person at a manual workstation for manufacturing goods, the process comprising the steps of:
   a) defining a task for the manufacture of the goods and storing data representative of the task in the memory of the computer as task data;
   b) evaluating the subjective preferences of the person at the manual workstation, wherein the preferences are stored as preference data in the memory of the computer;
   c) optimizing the task data for the person at the manual workstation;
   d) displaying the task data on a video monitor for viewing by the person;
   e) awaiting an input from the person to the computer indicating that the task was completed; and
   f) after the input is received, either returning to step a) or terminating the process.

4. A computer assisted, manual workstation comprising:
   a computer including a microprocessor, memory, a first video monitor and a second video monitor, and I/O circuitry;
   at least one tool for use in the manufacture of goods;
   said computer being programmed
      (a) to display a task to be executed by a person using said tool as quantitative information on said first video monitor and as qualitative information on said second video monitor; and
      (b) to wait for a response from said person through said I/O circuitry indicating that the task was correctly executed, whereupon the computer displays the next task for the person.

5. The computer assisted, manual workstation as set forth in claim 4 and further comprising a transmitter remote from said computer for sending a signal from said person to the I/O circuitry of said computer.

6. The computer assisted, manual workstation as set forth in claim 5 wherein said transmitter is portable and is carried on said person.

7. A process for providing computer assistance to a person at a manual workstation for cutting glass, said process comprising the steps of:
   defining a cut pattern in which the desired panes optimally fit a sheet from which the panes will be cut and storing said cut pattern in the memory of a computer;
   defining a cut sequence for said cut pattern by comparing said cut pattern with predetermined criteria stored in the memory of said computer;
   causing said computer to re-define said cut pattern if said criteria are not met, else displaying a cut from said cut pattern on at least one video monitor for said person to see;
   causing said computer to wait for a signal from said person, said signal indicating that the cut has been completed;
   displaying the next task in said cut sequence when said signal is received.

8. The process as set forth in claim 7 wherein said cut pattern is re-defined after each cut.

9. The process as set forth in claim 7 wherein said displaying steps each include the steps of:
   displaying the cut qualitatively on a first video monitor; and
   displaying the cut quantitatively on a second video monitor.

10. The process as set forth in claim 9 wherein the cut is displayed qualitatively as a graphic image including an image of said sheet and an image of the cut pattern.

11. The process as set forth in claim 10 wherein said cut pattern is displayed qualitatively by displaying visually distinct panes, cutoffs, and scrap.

12. The process as set forth in claim 7 and further including the steps of:
   storing data representative of stock inventory, data representative of cutoff inventory, and data representative of product inventory in said computer; and
   revising said data representative of stock inventory, data representative of cutoff inventory, and data representative of product inventory when said signal is received.

13. The process as set forth in claim 12 and further including the step of;
   displaying a unique storage location for a pane as each pane is completed, wherein the storage location for each pane is determined in accordance with an operation subsequent to cutting.

* * * * *